(12) United States Patent
Tanaka et al.

(10) Patent No.: US 7,279,270 B2
(45) Date of Patent: Oct. 9, 2007

(54) MANUFACTURING METHOD OF COMPOSITE FILM, COMPOSITE FILM, COLOR FILTER MADE OF COMPOSITE FILM, DISPLAY APPARATUS PROVIDED WITH COLOR FILTER

(75) Inventors: Keiichi Tanaka, Tenri (JP); Satoru Kishimoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 10/779,795

(22) Filed: Feb. 18, 2004

(65) Prior Publication Data

US 2004/0229139 A1 Nov. 18, 2004

(30) Foreign Application Priority Data

Feb. 18, 2003 (JP) .............................. 2003-40295
Feb. 13, 2004 (JP) .............................. 2004-37376

(51) Int. Cl.
*G03F 7/26* (2006.01)
(52) U.S. Cl. .......................................... 430/322; 430/7
(58) Field of Classification Search .................... 430/7, 430/322
See application file for complete search history.

(56) References Cited

U.S. PATENT DOCUMENTS 6,399,257 B1  6/2002  Shirota et al. ................. 430/7
6,864,034 B2 *  3/2005  Nishida et al. ............. 430/200
2001/0007733 A1 *  7/2001  Matsuyama et al. ........... 430/7
2003/0210361 A1 *  11/2003  Kiguchi et al. ............. 349/106

FOREIGN PATENT DOCUMENTS

EP  1 226 974 A1  7/2002

* cited by examiner

*Primary Examiner*—Kathleen Duda
(74) *Attorney, Agent, or Firm*—Birch, Stewart, Kolasch & Birch, LLP

(57) ABSTRACT

A color filter includes a black matrix and a color section. The black matrix has a plurality of partition sections extended alongside each other with a gap region therebetween. The color section is in a gap region of the black matrix. The color section is formed by applying a film material into the gap region of the black matrix by the ink-jet method, and then curing the film material thus applied. The black matrix has a protrusion section by which the gap region is partially narrowed. In applying the film material, the protrusion section functions as a barrier against the film material flowing, in the gap region. This prevents color mixing and uneven color density while maintaining high productivity.

9 Claims, 22 Drawing Sheets

FIG. 22

| SAMPLE | MIDDLE PART | STARTING EDGE | ENDING EDGE |
|---|---|---|---|
| FIRST (COLOR FILTER 50) | 1 | 1.04 | 1.06 |
| SECOND (COLOR FILTER 40) | 1 | 1.08 | 1.11 |
| THIRD (COLOR FILTER WITH NO PROTRUSION SECTION) | 1 | 2.45 | 2.91 |

MANUFACTURING METHOD OF COMPOSITE FILM, COMPOSITE FILM, COLOR FILTER MADE OF COMPOSITE FILM, DISPLAY APPARATUS PROVIDED WITH COLOR FILTER

This Nonprovisional application claims priority under 35 U.S.C. § 119(a) on Patent Application No. 2003/40295 filed in Japan on Feb. 18, 2003, and Patent Application No. 2004-037376 filed in Japan on Feb. 13, 2004, the entire contents of which are hereby incorporated by reference.

FIELD OF THE INVENTION

The present invention relates to a composite film such as a color filter and the like, a manufacturing method of the composite film, a color filter made of the composite film, and a display apparatus provided with the color filter.

More broadly, the present invention relates to an improved method for ink jet printing.

BACKGROUND OF THE INVENTION

Recently, liquid crystal display apparatuses are widely used as various display apparatuses such as display apparatuses for word processors, computers, navigation systems and the like. Moreover, the liquid crystal display apparatuses have been improved to have such a display quality that allows the liquid crystal display apparatuses to be used for color display.

Especially, liquid crystal display apparatus of active matrix type are mainly used. In the liquid crystal display apparatus of active matrix type, pixels are provided in matrix, and an active element such as a thin film transistor and the like is provided to each pixel. The active element functions as a switching element of the pixel to which the active element is provided.

A general liquid crystal display apparatus of active matrix type is provided with a first glass substrate and a second glass substrate. The first glass substrate is provided with scanning lines, gradation signal lines, switching elements, and pixel electrodes. The second glass substrate is provided with a black matrix, a color filter and a common electrode. The first and second glass substrates are so positioned as to face one another with a predetermined gap region therebetween. A liquid crystal material is filled in the gap. Then, a sealing material, which is cured (hardened) by application of heat or light, is applied around the first and second glass substrates. By using the sealing material, the first and second glass substrate are sealed. Voltages between the pixel electrodes and the common electrode are controlled pixel by pixel so as to perform gradation display in which gradation of each pixel is controlled.

The high cost of such liquid crystal display apparatus has not been reduced because of its complicated manufacture and large number of parts. Reduction in retail price of the liquid crystal display apparatus is necessary for obtaining a wider market. In view of this, various arts have been suggested to reduce a cost of the color filter, which is one of most expensive constituent elements of the liquid crystal display apparatus.

In general, the pigment dispersing method is used for manufacturing the color filter. In the pigment dispersing method, a filter pattern is formed by a photo process. In the pigment-dispersing method, specifically, a photosensitive resin in which a pigment is dispersed is wholly applied on a surface of the substrate by the spin-coating or the like. A film of the photosensitive resin is developed by performing pattern-exposure of the film to ultra violet radiation. Thereby, a filter pattern of one color is formed. The film is developed several times in this manner so as to form a color filter layer including a black matrix.

In the pigment dispersing method, a majority of the photosensitive resin in which the pigment is dispersed is removed in the development for forming filter patters of each color. Therefore, the pigment dispersing method has a high material cost. The high material cost hinders the reduction in the manufacturing cost of the color filter.

Recently, a method of manufacturing a color filter by using the ink-jet method is suggested for reduction in the material cost and the number of steps in manufacturing the color filter. For example, U.S. Pat. No. 6,399,257 B1 suggests such a method.

With reference to FIGS. 15(a) to 15(f), the method of manufacturing the color filter disclosed in U.S. Pat. No. 6,399,257 B1 is explained below. Note that FIGS. 15(a) to 15(f) illustrate the following steps a to f, respectively In the step a, a light shielding layer 102 (black matrix) having opening sections 102a is formed on a substrate 101. The shielding layer 102 is constituted of light shielding members patterned in lines or in grid. The shielding layer 102 is formed by patterning a photosensitive black resin layer or the like by the photolithography method. Here, the light shielding layer 102 is made of a black resin and has a large thickness, so that the light shielding layer 102 functions as a portion in later-described application of a curing ink. Note that the shielding layer may be formed by another method, for example, thermal imaging process (LITI method) disclosed in EP 1,226,974 A1.

In the step b, a photosensitive layer 103 is formed overall on a surface of the substrate 101 on which the light shielding layer 102 are formed. The photosensitive layer 103 is a layer that becomes hydrophilic or more hydrophilic by radiating light thereon. Preferably, the photosensitive layer 103 contains at least one of $TiO_2$, $SnO_2$, ZnO, $WO_3$, $SrTiO_3$, $Bi_2O_3$, and $Fe_2O_3$, as a photosensitive compound. When light is radiated on the photosensitive layer 103 containing at least one of those compounds, electrons and pores are exited by the radiation of the light. The excited electrons and pores react with water and oxygen that is adsorbed to a surface of the photosensitive compound, thereby producing active oxygen. As a result, that area of the photosensitive layer 103 on which the light is radiated becomes hydrophilic. On the other hand, metal oxides such as the photosensitive compounds are, by nature, hydrophobic and oil-repellant. Thus, that area of the photosensitive layer 103 on which the light is not radiated does not become hydrophilic. Thus, ink is likely repelled on that area of the photosensitive layer 103 on which the light is not radiated. Therefore, in applying the curing ink by using the ink-jet method as described later, a non-light-radiated area (that is, non-hydrophilic regions) between each adjacent light-radiated area (that is, hydrophilic region) repels the ink thereby having color mixing prevention function. Thus, it is possible to prevent ink of different color from mixing with each other.

Specific examples of the methods of forming the photosensitive layer 103 using the photosensitive compound are (a) a sintering method in which the photosensitive compound is sintered on the substrate by applying a high temperature (a temperature higher than crystallization temperature of the photosensitive compound), and (b) a calcining method in which a composition prepared by dispersing alkoxysilane and the photosensitive compound in a solvent such as alcohol or the like is applied on the substrate 101 and heated so as to form a film.

In the sintering method, it is necessary to apply a high temperature not less than 400° C. In case the light-shielding layer 102 and the like, which is essentially made of a resin material, are formed on the substrate 101, there is a possibility that the light-shielding layer 102 is deteriorated by the high temperature application. Thus, the sintering method is not so preferable in such a case. Moreover, even if the light-shielding layer 102 is made of a metal material such as chromium or the like, the sintering method is not so preferable because the high temperature application likely causes size inaccuracy of the light shielding layer 102. Therefore, the calcining method is preferable in which the composition is applied and calcined because the calcining method uses a lower temperature.

The photosensitive layer 103 thus formed becomes more hydrophilic by the pattern-exposure that causes water molecules and the like to be adsorbed to the light radiated areas. As to wavelength of the light for use in the pattern-exposure, light of relatively short wavelength out of the ultraviolet region should be used for some photosensitive compounds, whereas visible light of relatively long wavelength may be used for some photosensitive compounds. Thus, a wavelength most suitable for the photosensitive compound to be used may be arbitrarily selected.

Examples of the method of applying the composition so as to form the photosensitive layer 103 are: spin coating, roll coating, bar coating, spray coating, dip coating, and the like.

A thickness of the photosensitive layer 103 is preferably in a range of 0.01 μm to 10 μm, and more preferably in a range of 0.01 μm to 5 μm.

In step c, the photosensitive layer 103 is exposed to the light directed thereto from below the substrate 101 (the light is directed to the photosensitive layer 103 via the substrate 101), so as to form hydrophilic regions 104 in the areas that are exposed to the light. The hydrophilic regions 104 are the areas that become hydrophilic or more hydrophilic by the radiation of the light. The areas that are not exposed to the light are less hydrophilic. Thus, the areas that are not exposed to the light are referred to as non-hydrophilic regions 105 here for easy explanation. The photosensitive layer 103 is formed on the light-shielding layer 102. Thus, the exposure of the photosensitive layer 103 can be performed with the light-shielding layer 102 used as a mask. It is preferable to form color sections (sections that are to be colored) so that the color sections have a larger area than the opening sections 102a, in order to prevent the color filter from having a white spot (an uncolored spot that is caused in a border section between the color section and the light-shielding layer). In view of this, it is necessary that the part of the photosensitive layer 103 which is to be exposed be larger than the opening sections 102a in the light shielding layer 102. Specifically, it is preferable to use scattering light so as to radiate in the exposure. Alternatively, for example, it is also effective that over exposure is carried out so as to cause the reaction in a larger area.

Note that, here, the photosensitive layer 103 is exposed to the light directed thereto from below the substrate 101. However, it may be arranged such that the photosensitive layer 103 is exposed to the light directed thereto from above the substrate while using a photo mask. In this case, in order to prevent the formation of white spots, it is preferable that the mask used has an opening section wider than the opening section 102a of the light-shielding layer 102. Specifically, it is preferable that the areas that are not exposed are formed on parts of the light-shielding layer 102 whose edges are located inner from edges of the opening sections 102a of the light-shielding layer 102a by 3 μm or more.

The pattern exposure may be carried out in stripe (line) or in grid, as shown in FIGS. 16(a) and 16(b). FIG. 16(a) illustrates a case in which the pattern exposure in stripe is carried out. In this case, the light-shielding layer 102 is provided with the opening sections 102a for respective pixels. Color sections 107 in a stripe shape are continuously aligned in a row direction. FIG. 16(b) illustrates a case where the pattern-exposure in matrix is carried out. In this case, the matrix of the pattern-exposure corresponds to locations of the opening sections 102a of the light-shielding layer 102.

In step d, curing ink 106 (ink that can be cured) is applied on the hydrophilic regions 104 by the ink-jet method in accordance with a predetermined color pattern. In general, for making a color filter, the curing ink 106 is ink of three colors, namely, R, G, and B (Red, Green, and Blue).

It is preferable that the curing ink 106 used here contains polymers, oligomers or the like as a binder component (a bridging component to perform bridging by heat application or light radiation). Such polymers, oligomers, and the like may be constituted by solely polymerizing a monomer constituted of a structural unit represented by the following chemical formula (1), or by copolymerizing the monomer with another vinyl monomer. Note that $R_1$ and $R_2$ in chemical formula (1) are substituents and may be different from each other.

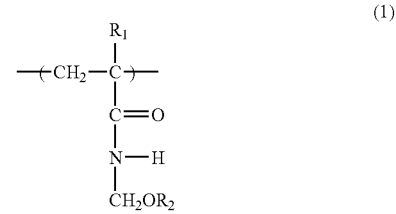

$$(1)$$

The monomer constituted of the structural unit represented by chemical formula (1) may be, but not limited to, N-methylolacrylamide, N-methoxymethylacrylamide, N-ethoxylmethylacrylamide, N-isopropoxylmethyacrylamide, N-methylolmethacrylamide, N-methoxylmethylmethacrylamide N-ethoxymethylmethacrylamide, and the like. The monomer may be polymerized solely, or copolymerized with another vinyl monomer. The another vinyl monomer may be, but not limited to, (i) acrylic acid, (ii) methacrylic acid, (iii) ester acrylic acids such as methyl acrylic acid, ethyl acrylic acid, and the like, (iv) ester methacrylic acids such as methyl methacrylic acid, ethyl methacrylic acid, and the like, (v) vinyl monomers containing a hydroxyl group, such as hydroxymethylmethacrylate, hydroxyethylmethacrylate, hydroxylmethylacrylate, hydroxylethylacrylate, and the like, (vi) other compounds such as styrene, α-methyl styrene, acrylamide, methacrylamide, acrylonitril, allylamine, vinylamine, aceticamine, vinylpropionate, and the like.

Moreover, a molecular weight of a major constituent of the compound (binder component) is preferably in a range of 500 to 50000, more preferably in a range of 1000 to 20000, considering that the compound should be jetted out (applied, sprayed) by the ink-jet method. Furthermore, content of the compound in the ink is preferably in a range of 0.1% by weight to 15% by weight, more preferably in a range of 1.0% to 10% by weight.

Furthermore, the curing ink 106 contains a color material, which may be of dye type or pigment type.

Moreover, (i) the bubble-jet type ("bubble jet" is a trademark of Canon, Inc.) in which an electric-heat converter as an energy generating element, (ii) piezo jet type in which a piezoid is used, (iii) and the like method may be used as the ink-jet method. Color section and color pattern of the ink-jet method may be arbitrarily set.

In step e, the curing ink 106 is cured by a necessary process, that is, heat application or light radiation. Thereby, color sections 107 of R, G and B are formed.

In step f, according to need, a protective layer 108 is formed. The protective layer 108 may be (i) a resin layer that is made of a photo-curing type resin, a thermal curing type resin, a resin that is cured by both light and heat, (ii) an inorganic film that is formed by deposition, sputtering, or the like, (iii) or the like, provided that the color filter having the protective layer 108 is transparent, and has enough tolerance to undergo ITO (Indium-Tin Oxide) film (transparent electrode) formation process, and alignment layer formation process.

Incidentally, in the manufacturing method disclosed in U.S. Pat. No. 6,399,257 B1, the light-shielding layer 102, which has the portioning function in applying the curing ink, functions as a black matrix of the color filter. The light-shielding layer 102 is grid-shaped (patterned in matrix), as shown in FIGS. 16(a) and 16(b). Hereinafter, the light-shielding layer 102 is referred to as a black matrix 102.

When the curing ink 106 is applied, by the ink-jet method, onto the substrate 101 on which the black matrix 102 of the grid shape is formed, an amount of the curing ink 106 to be applied into each opening section 102a is dependent on how many droplets are jetted into each opening section 102a. This is because, in the black matrix 102 of the matrix shape, the curing ink 106 thus applied does not flow from one opening section 102a to another opening section 102a. Thus, the amount of the curing ink 106 to be applied into each opening section 102a is determined by how many droplets are jetted into each opening section 102a Moreover, the amount of the curing ink 106 to be applied in each opening section 102a determines color density in each opening section 102a. Thus, in order to prevent uneven color densities among the opening sections 102a, it is necessary to control the jetting such that the substantially same number of the droplets of the curing ink 106 are jetted into each opening section 102a.

However, in reality, it is very difficult to control the jetting (application of ink) as such in the ink-jet method. As a result, there is such a problem that the color densities are highly uneven among the opening sections 102a when the ink-jet method is used for the black matrix 102 of the grid shape as shown in FIGS. 16(a) and 16(b).

FIG. 17 illustrates a black matrix 112 having such a pattern that each opening section 112a is not partitioned in a column direction. On contrary to the black matrix 102 of the grid shape as shown in FIGS. 16(a) and 16(b), it is easier to apply the curing ink 106 in even amounts in each opening section 112a in the black matrix 112 as shown in FIG. 17. The amount of the curing ink 106 to be applied in each opening section 112a of the black matrix 112 is much greater than the amount of the curing ink 106 to be applied in each opening section 102a of the black matrix 102. Thus, in the black matrix 112, it is easier to suppress the unevenness among the opening sections 112a in terms of the amount of the curing ink 106 to be applied therein. For example, in case of a color filter for a XGA class liquid crystal display apparatus, the amount of the curing ink 106 to be applied in each opening section 112a is about 768 times greater than that in each opening section 102a.

Therefore, compared with the black matrix 102, it is easier in the black matrix 112 to suppress the unevenness among cells in terms of the color density.

However, the inventors of the present invention found that the following problems arise in the black matrix shown in FIG. 17.

In applying the curing ink 106 by using the ink-jet method, the substrate 101 is scanned by using an ink jet head with a predetermined relative velocity Vh. Moreover, the curing ink 106 is jetted out from the ink jet head at a jetting-out velocity Vv. Therefore, a droplet of the curing ink 106 is hit at the substrate 101 at a resultant velocity Vt, which is a resultant velocity of the relative velocity and the jetting out velocity Vv, as shown in FIG. 18.

When the droplet 106a hits the substrate 101 at the resultant velocity Vt, the liquid droplet 106a thus is spread widely from a point at which the droplet 106a hits. If the resultant velocity Vt, especially, the relative velocity Vh is large, the curing ink 106 is so spread that, as shown in FIG. 19, the curing ink 106 is thick upstream and thin downstream of the relative velocity Vh. As a result, the color sections made of the curing ink 106 have uneven thickness, thereby causing uneven color density.

Moreover, if the resultant velocity Vt, especially, the relative velocity Vh is large, a speed of spreading the curing ink 106 is fast. In this case, there is a possibility that part of the curing ink 106 flows over the black matrix 112 that is the partition, and flows over even the non-hydrophilic region 105, so as to reach the opening section 112a adjacent thereto. This causes color mixing between adjacent color sections 107.

One solution avoid such problem is to reduce the relative velocity. However, the reduction of the relative velocity lowers throughput of the applying step of the curing ink 106, thereby reducing productivity of the color filter.

That is, when the art used conventionally is adopted in the ink jet method that is effective in reducing the material cost and the number of steps, it is not possible to solve the problem of deterioration of the property of the color filter, without deteriorating high productivity.

Further, the inventors of the present invention found that the color sections 107 tend to be thicker toward edge parts and thinner in a middle part (longitudinally) with respect to a vertical direction in FIG. 17, the color sections 107 formed by applying the curing ink 106 onto the substrate on which the black matrix 112 as shown in FIG. 17 is provided. Because the edge parts are where the flow of the curing ink ends, ambient vapor concentration of a vaporized solvent is less around the edge parts and more around the middle. Thus, the curing ink 106 dries at a higher drying rate in the edge parts compared with in the middle part. As a result, the curing ink 106 flows from the middle part, where the curing ink 106 dries slower, toward the edge parts. This phenomenon causes unevenness in the color density between the middle part and edge parts in the color filter.

Note that the problem is not limited to the production of the color filter, but is common in the manufacturing process including the step of forming a film by applying a film material by using the ink-jet method.

SUMMARY OF THE INVENTION

In view of the forgoing problem, the present invention has an object of providing (i) a method of manufacturing, without spoiling a high productivity, a composite film or any similar printed article or product of high quality, the composite film formed by applying a film material by an ink-jet method, (ii) and the like.

A method according to the present invention comprises printing, via an ink jet printing process, within an individual area to be printed, and providing within such area at least one barrier which prevents undesirable flow of the applied ink or printing medium within such area. In accordance with the invention, the barrier to flow may comprise any physical obstacle in the path of undesirable flow of the printing medium, such as a protrusion, recess, or other construction with impedes undesirable flow. A barrier to flow may also comprise any other force or physical thing which imparts to the printing medium a restraint against undesired flow of the printing medium.

A method of manufacturing a composite film including a first film and a second film, the first film having a plurality of partition sections extended, in one direction, along each other with a gap region therebetween, and the second film being located in the gap region, the method includes the steps of: (i) forming the first film on a substrate; and (ii) applying a film material in the gap region by an ink-jet method along the direction in which the partition sections are extended, and curing the film material thus applied, so as to form the second film, the first film having a gap width regulating section, by which a width of the gap region is partially narrowed.

In the method, the second film is formed by applying the film material, along the direction in which the partition section is extended, into the gap region of the first film by the ink-jet method. Thereby, the composite film in which the second film is partitioned by the first film is manufactured. For example, this method can be suitably used for manufacturing a composite film, such as a color filter that has a light-shielding film that corresponds to the first film, and a transparent color film that corresponds to the second film.

In this method, it is preferable that the speed at which the film material is applied by the ink-jet method, that is, the relative velocity between the substrate and the ink jet nozzle for jetting out the film material is large. However, in general, a high relative velocity causes such problems that the film material flows over the partition section, and/or the film material thus applied has an uneven film thickness. Such problems cause, in case of the color filter, color mixing and/or uneven color density, thus resulting in quality deterioration of the color filter.

As a solution to the problems, the first film has the gap width regulating section in the manufacturing method. The width of the gap region is partially narrowed by the gap width regulating section. In applying the film material, the gap width regulating section functions as a drag portion against a film material flowing in the column direction in the gap regions. With this arrangement, it is possible to prevent the film material from flowing over the partition section and to attain lower unevenness in the film thickness of the film material thus applied. It is deduced that such effects are attained because the gap width regulating section causes the film material to spread at a slower rate or to spread less on the substrate after being applied thereon by jetting out from the ink jet nozzle.

According to the manufacturing method, as described above, it is possible to apply the film material at a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

A composite film of the present invention includes (a) a first film having a plurality of partition sections extended, in one direction, along each other with a gap region therebetween, and (b) a second film formed by applying a film material in the gap region by an ink-jet method and curing the film material, the first film having a gap width regulating section, by which a width of the gap region is partially narrowed.

The composite film arranged as above can be manufactured by the above method. Thus, as described above, The composite film can be manufactured by applying the film material at a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

The various preferred embodiments discussed herein involve use of a partition or barrier which extends upwardly from a surface to be printed in order to constitute a barrier to undesired flow of the printing medium. However, the invention is not limited to such configurations. A barrier to undesired flow of printing medium may comprise, for example, a recess in the surface to be printed, or any other physical configuration or element which achieves the result of impeding undesired flow of the printing medium. Further, in the event that the printing medium is responsive to an applied force, such as a magnetic field, electrostatic field, or the like, the barrier to undesired flow may comprise means for applying such a force to impede the undesired flow of printing medium at selected positions.

For a fuller understanding of the nature and advantages of the invention, reference should be made to the ensuing detailed description taken in conjunction with the accompanying drawings.

BRIEF DESCRIPTION OF THE DRAWINGS

FIG. 9(b) shows a positional relationship between the active matrix substrate and the black matrix that is positioned to face the active matrix substrate.

FIG. 22 is a table showing result of evaluation of unevenness in film thickness of color sections.

DESCRIPTION OF THE EMBODIMENTS

Figure 1:
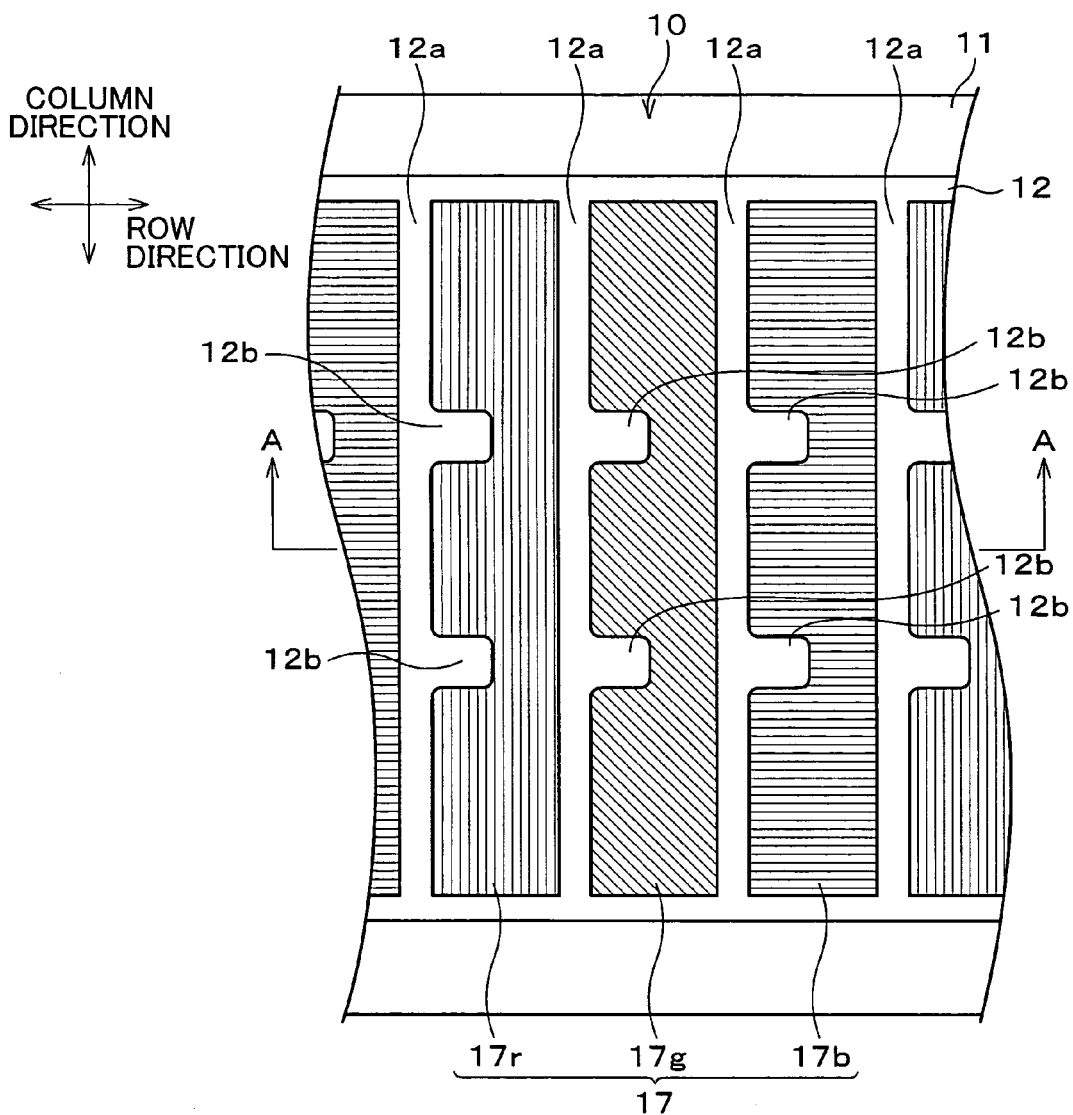
FIG. 1(a) is a plan view of a color filter of a first embodiment of the present invention.
FIG. 1(b) is a cross sectional view taken on line A-A of FIG. 1(a).
Figure 1:
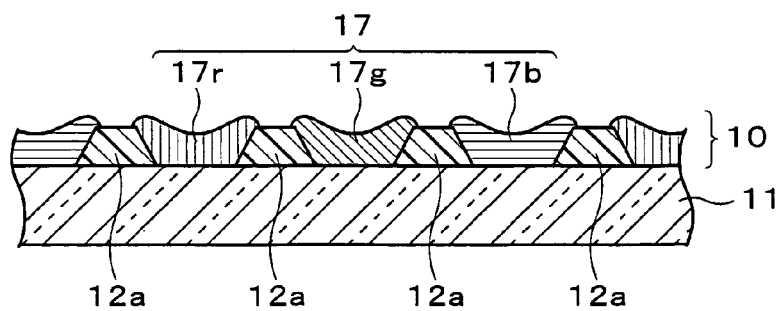

A first embodiment of the present invention is described below, referring to FIGS. 1 to 10.

FIG. 1(a) is a plan view of a color filter 10 of the present embodiment, while FIG. 1(b) is a cross-sectional view taken on line A-A of FIG. 1(a).

The color filter 10 is provided on a substrate 11. The color filter 10 is provided with color sections 17, which functions as transparent color films, and a black matrix 12, which functions as a light-shielding film. The color sections 17 includes red color sections 17r, green color sections 17g, blue color sections 17b, corresponding to three primary colors RGB.

Here, the color sections 17 are films formed by curing a film material that has been applied by the ink-jet method as described below. In the color section 17 thus formed, the red color sections 17r, the green color sections 17g, and the blue color sections 17b are patterned in stripe.

The black matrix 12 functions as a partition that separates adjacent color sections in applying the film material, that is, a partition to separate the red color section 17r and the green color section 17g, the green color section 17g and the blue color section 17b, and the blue color section 17b and the red color section 17r. Hereinafter, the parts of the black matrix 12 which function as the partition are referred to as partition sections 12a. The partition sections 12a are a plurality of members provided in parallel with "gaps" (gap regions) and extended in the same direction. The direction (longitudinal direction) in which the partition section 12a is extended (that is a vertical direction in FIG. 1(a)) is referred to as "column direction" for easy explanation. Ends of the partition sections 12a with respect to the column direction may be connected with each other as shown in FIG. 1(a), but may be separated from each other.

Then, the red color sections 17r, the green color section 17g, and the blue color section 17b are respectively located in openings of the black matrix 12, that is, between the partition sections 12a. Hereinafter, the openings of the black matrix 12 are referred to as "gap regions of the black matrix 12" or simply "gap regions". Moreover, a width direction of the gap regions is in a direction perpendicular to the column direction, that is, in a lateral direction of FIG. 1(a). The width direction of the gap regions is referred to as "row direction" for easy explanation, hereinafter.

The color filter 10 is provided with protrusion sections 12b that are protruded toward the gap regions. The plurality of the protrusion sections 12b are provided along the column direction of the partition sections 12a. The protrusion sections 12b are sections (gap width regulating sections) for regulating width of the gap regions. The width of the gap regions is partially narrowed by the protrusion sections 12b. As described below, the protrusion sections 12b functions as a drag portion (portion to retard flowing) against a film material flowing in the column direction in the gap regions.

Figure 6:
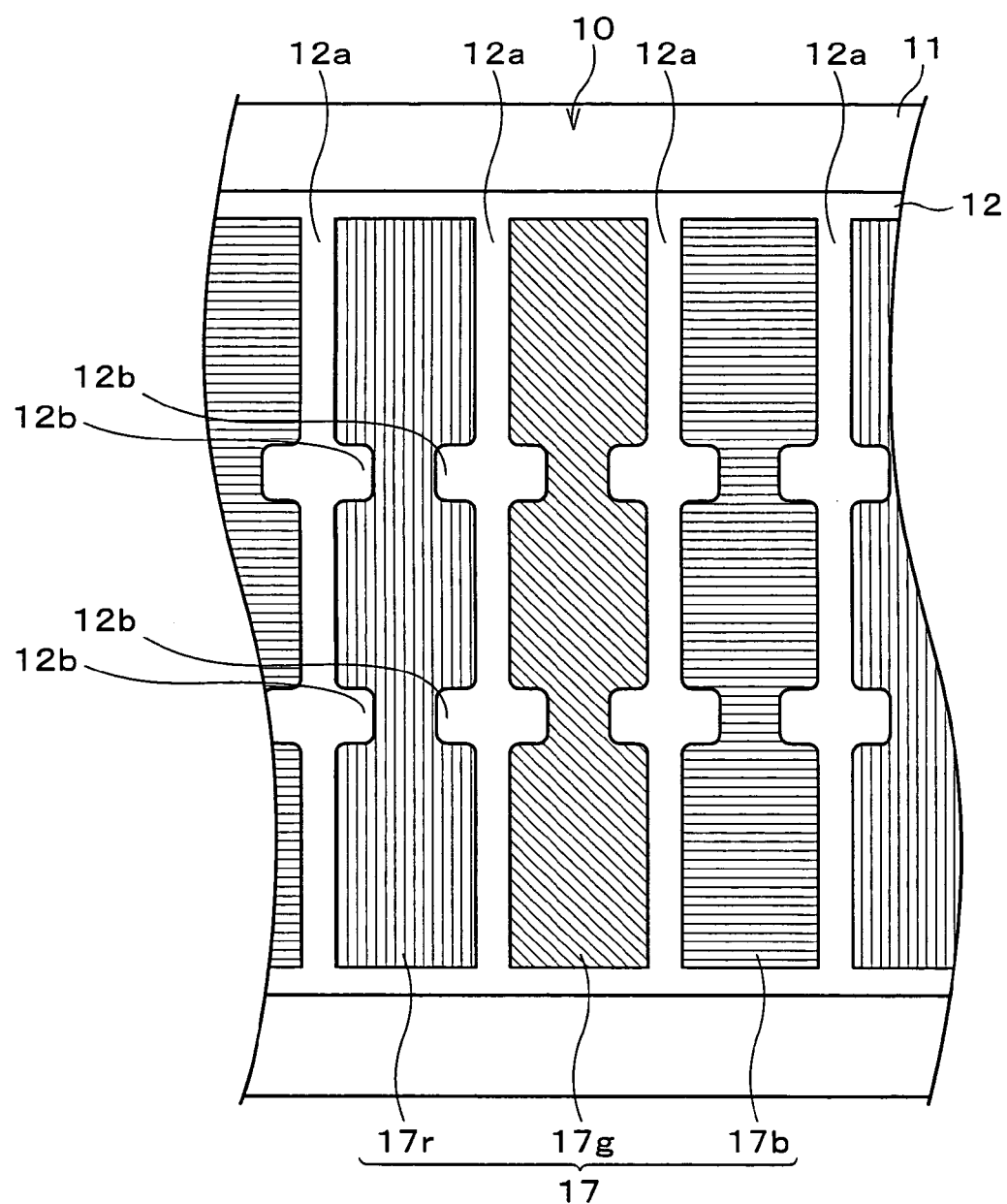
FIG. 6 is a plan view illustrating a color filter of a modification of the first embodiment of the present invention.
Figure 7:
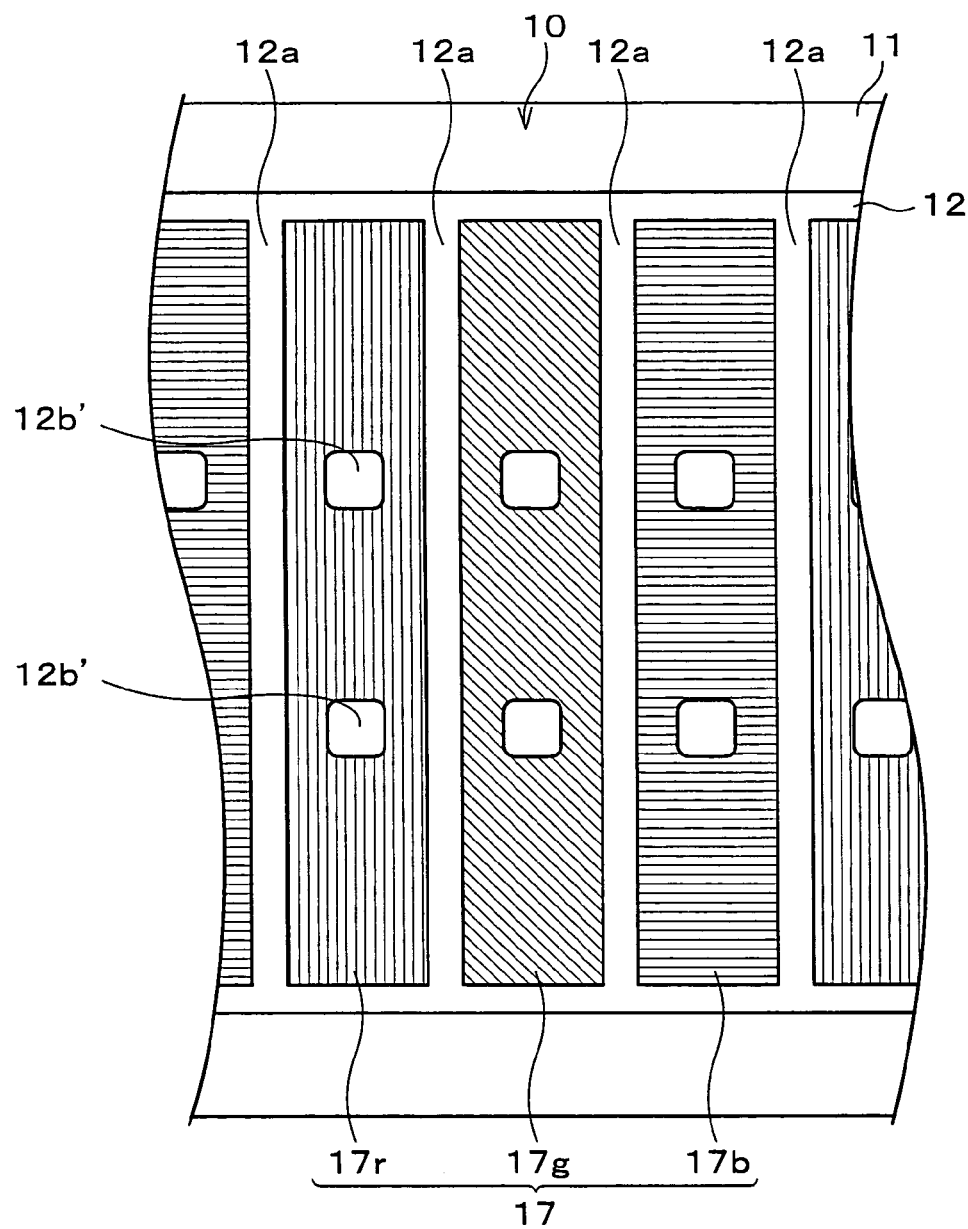
FIG. 7 is a plan view illustrating a color filter of another modification of the first embodiment of the present invention.

Note that the black matrix 12 may be patterned as shown in FIG. 6 or 7, apart from the pattern shown in FIG. 1(a). That is, as shown in FIG. 6, the partition sections 12a may be protruded partially on both sides thereby forming the protrusion sections 12b. As shown in FIG. 7, island-shaped sections 12b' may be provided instead of the protrusion sections 12b, the island-shaped sections 12b' separated from the partition sections 12a. Similarly to the protrusion sections 12b, the island-shaped sections 12b' are sections for narrowing the width of the gap regions. In case the island-shaped sections 12b' are provided, the island-shaped sections 12b' are concurrently formed when the partition sections 12a are formed, whereby it is possible to avoid addition of a new step The color filter 10 is so arranged that the protrusion sections 12b are located in vicinity of borders between each pixel aligned in the column direction. Therefore, in FIG. 1(a), each column are illustrated as having three pixels. However, each column has a large number of pixels in reality.

Next, referring to FIGS. 2(a) to 2(c), a manufacturing method of the color filter 10 is explained. In the manufacturing method, a black matrix forming step, a film material applying step, and a film material curing step are carried out in this order. Note that raw materials, dimensions, and the like of a color filter 10 actually manufactured are mentioned below, but the manufacturing method of the present invention is not limited to the specified raw materials, dimensions, and the like.

In the black matrix forming step, onto the substrate 11 made of glass or the like, a photosensitive resin material, in which carbon is dispersed, is applied to a thickness of 1.5 μm by spin-coating method. Then, the photosensitive resin material is baked to dryness by baking for 120 seconds in an oven at 110° C. Thereby, a photosensitive resin film is formed. After that, proximity exposure is performed so as to expose the photosensitive resin film to light in a predetermined exposure pattern via a exposure gap (proximity gap) sized of 50 μm. Then, a unexposed region is removed by using alkali developer. The exposure pattern used here is the pattern that gives the pattern of the black matrix 12 shown in FIG. 1(a). Next, the substrate 11 is dried at 250° C. for 90 minutes, thereby forming the black matrix 12 as shown in FIG. 2(a). Note that the partition sections 12a of the black matrix 12 are illustrated in FIG. 2(a).

Here, the photosensitive resin material is of negative type. However, the photosensitive resin material is not limited to the negative type. Provided that the black matrix 12 made of the photosensitive resin film is satisfactory in terms of properties that the black matrix 12 is required to have, the photosensitive resin material may be any type, regardless of where the type is a negative type or a positive type. The properties that the black matrix 12 is required to have are adhesion property resolution of exposure, light-shielding property as a black matrix.

Figure 3:
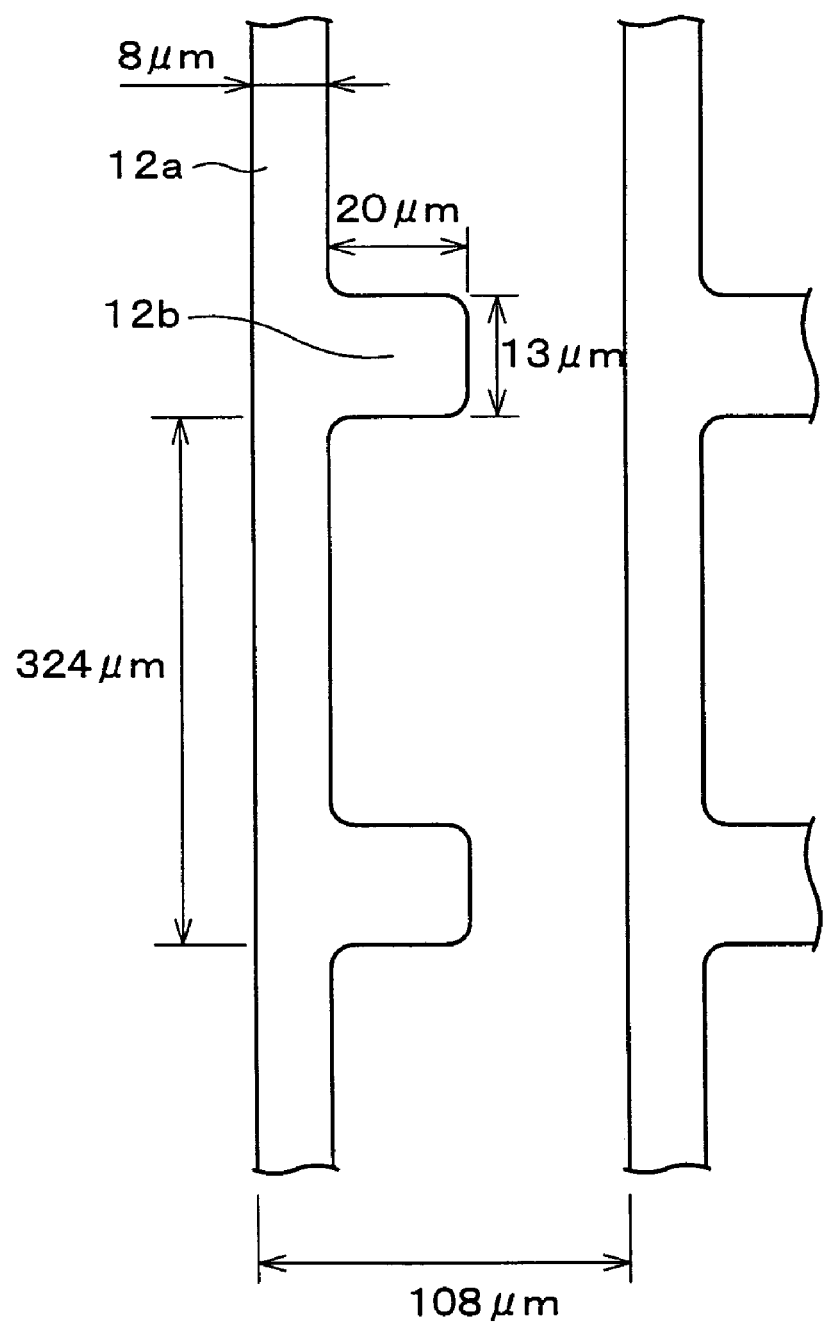
FIG. 3 is a plan view of a black matrix of the color filter shown in FIG. 1.

Each section of the black matrix 12 is sized as shown in FIG. 3. That is, the partition section 12a has a width of 8 μm, the protrusion section 12b has a size of 13 μm×20 μm, pixel pitch is 108 μm×324 μm. Thereby, 1024×768 pixels were formed. Note that only 3 pixels are aligned in each column in FIG. 1(a), as described above.

The protrusion section 12b has a substantially rectangular shape in a plane view (in a bird's eye view). Corners of the protrusion sections 12b are round (curved, non-acute). This shape of the protrusion section 12b prohibits uneven flow of the film material in applying the film material by the ink jet method, thereby attaining a lower unevenness in film thickness.

In the film material applying step, by the ink-jet method, film materials 16r, 16g, and 16b are applied, as shown in FIG. 2(b), onto gap regions 12c of the black matrix 12 that is shown in FIG. 2(a). The film materials 16r, 16g, and 16b are film materials for RGB colors respectively. Note that the application of the film materials 16r, 16g, and 16b may be carried out concurrently or sequentially in order. The film materials 16r, 16g, and 16b are curing ink in which pigments of the colors are respectively dispersed and whose viscosity is adjusted to 20 cps. Hereinafter, the film materials 16r, 16g, and 16b may be referred to as a film material 16 collectively, where the colors of the film materials 16r, 16g, and 16b are not specifically regarded.

Figure 4:
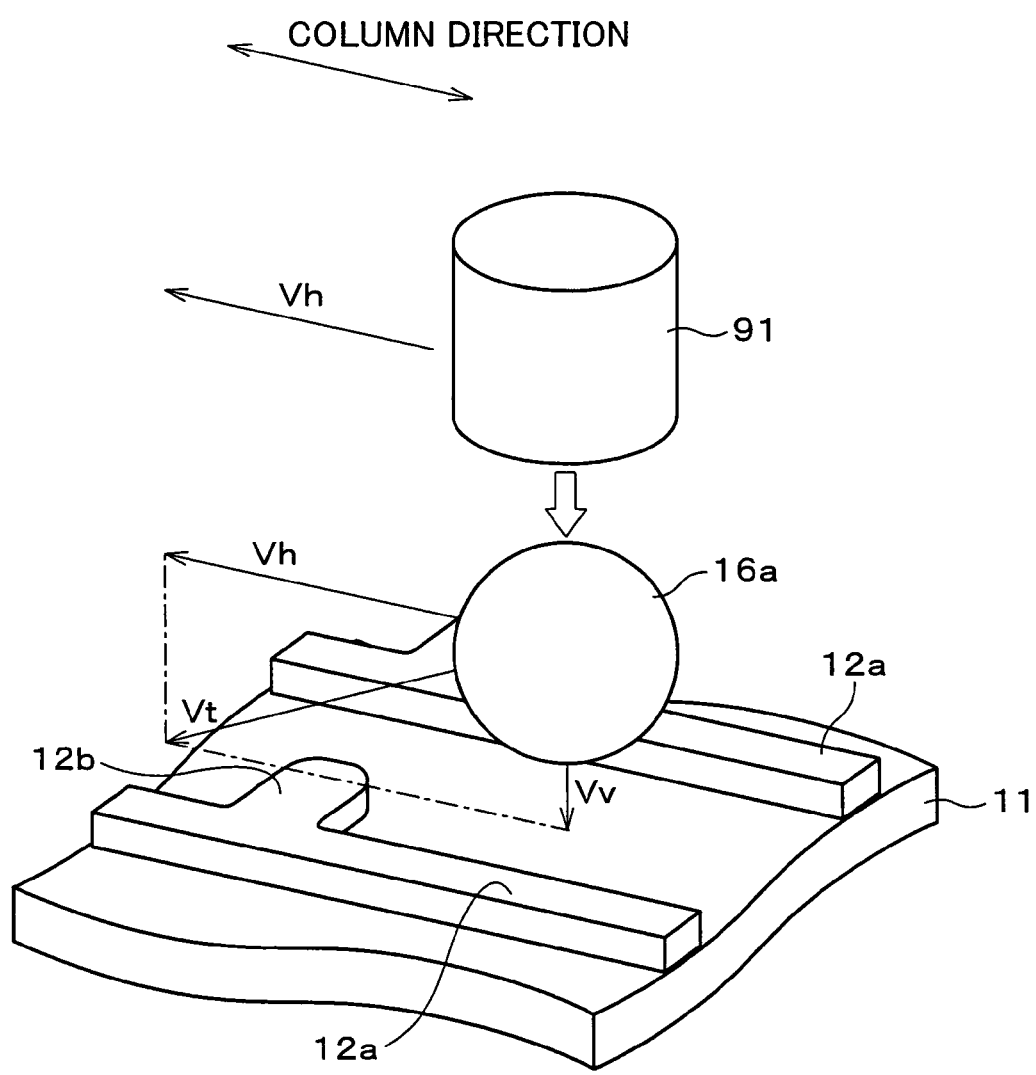
FIG. 4 is a perspective view for explaining velocity of an ink jet nozzle with respect to a substrate and velocity of a droplet of a film material, in applying the film material by an ink-jet method.

As shown in FIG. 4, an ink jet nozzle 91, which is being moved unidirectionally in the column direction with respect to the substrate 11, continuously jets out droplets 16a of the film material 16. Actually, the application was carried out as follows: the ink jet nozzle 91 was moved at a relative velocity Vh of 0.1 m/sec with respect to the substrate 11; the droplets 16a were jetted out from the ink jet nozzle 91 at a jetting velocity Vv of 0.6 m/sec in a jetting timing in which the droplets 16a were jetted at about 50 μm intervals as the ink jet nozzle 91 moved. Therefore, the droplets 16a were hit on the substrate 11 at a resultant velocity Vt that were combination of the relative velocity Vh and the jetting velocity Vv.

When the droplets 16a (film material 16) hit on the substrate 101 at the resultant velocity Vt, the droplets 16a thus applied by jetting are spread broadly from the point at which the droplet 16a hits substrate 11. In jetting the droplets 16a,the conventional arrangement in which the black matrix 12 is provided with no protrusion section 12b, has such problems that the film material 16 is applied in an uneven thickness thereby causing unevenness in color density, and that the film material 16 flows over the partition section 12a thereby causing color mixing, as explained in the BACKGROUND OF THE INVENTION. Note that the film material 16 and the droplets 16a correspond to the curing ink 106 and the droplets 106a in the BACKGROUND OF THE INVENTION.

In the arrangement of the present embodiment in which the black matrix 12 was provided with the protrusion sections 12b, however, unevenness in the color density due to the unevenness in the thickness of the film material 16 was sufficiently small, and the color mixing due to the overflow of the film material 16 could be prevented. Further, even if the relative velocity Vh was increased to 0.35 m/sec, the unevenness in the color density was sufficiently small, and the color mixing was prevented. The provision of the protrusion sections 12b prevented high unevenness in color density and color mixing.

Figure 5:
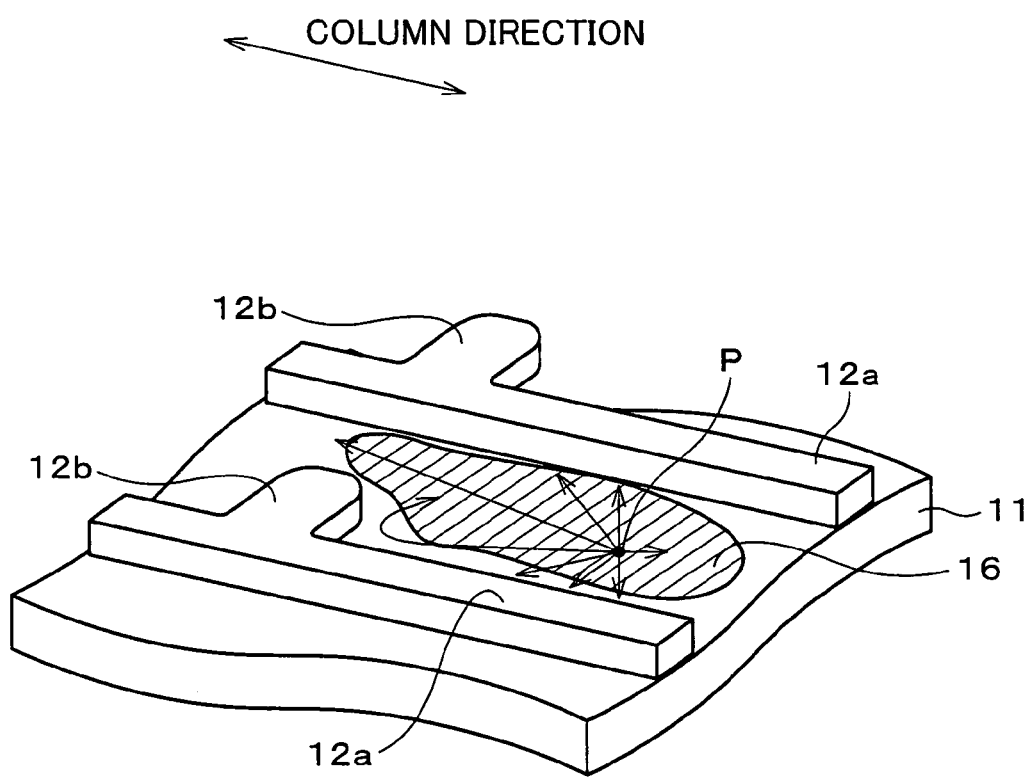
FIG. 5 is a perspective view illustrating how the film material hit on the substrate is spread.

The reason why the provision of the protrusion sections 12b has this effect is believed to be as follows. The film material 16 applied on the substrate 11 by jetting the droplets 16a onto the substrate 11 spread, as shown in FIG. 5, in all directions from a hitting point P after being hit on the substrate 11. However, because of the effect of the relative velocity Vh, the film material 16 spread widely in a positive or forward direction of the relative velocity Vh.

Figure 19:
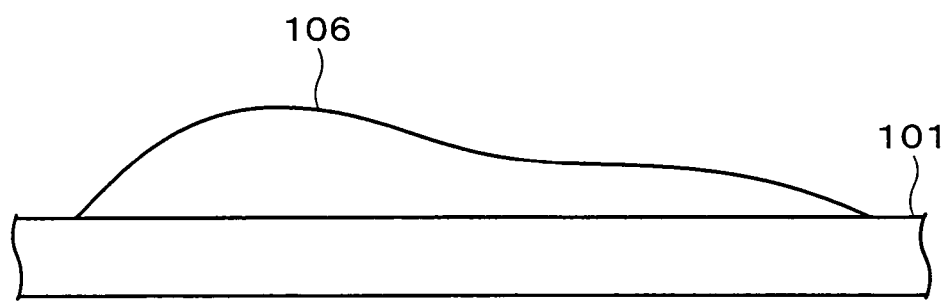
FIG. 19 is a cross sectional view showing unevenness in thickness of the curing ink hit and spread on the substrate.

When the film material 16 spread as such, the protrusion section 12b partially retarded the spreading of the film material 16, thereby sending back part of the film material 16 toward the hitting point P. As a result, an amount of the film material 16 settled near the hitting point P was increased, thereby alleviating the conventionally problematic uneven thickness of the film material 16 as shown in FIG. 19.

Moreover, because the gap regions were narrowed by the protrusion sections 12b, the film material 16 flowed at a slower rate when passing the parts of the gap regions which were narrowed by the protrusion sections 12b. Thus, an inertial force of the spreading of the film material 16 was reduced. As a result, the film material 16 enough energy to flow over the partition sections 12a, whereby the color mixing was prevented.

It is deduced that the same effect can be attained by a black matrix shaped as a grid, that is, the black matrix 12 in which the protrusion sections 12b are extended from one partition section 12a and reaches the adjacent partition 12a. As explained in the BACKGROUND OF THE INVENTION, however, the black matrix shaped as a grid requires a more accurate control in the number of the droplets per one pixel, lest that the color density be highly uneven between the pixels.

In the black matrix shaped as a grid, each individual area partitioned by the black matrix corresponds to each pixel respectively. In such black matrix shaped as a grid, a volume of the film material to be applied into each individual area partitioned by the black matrix is: 1.5 μm×(108 μm−8 μm)μm×(324 μm−13 μm)=about 47000 μm$^3$, if the film thickness of the film material is 1.5 μm for example. On the other hand, in the black matrix of the present embodiment, the volume of film material is related to the number of pixels aligned in the column direction continuously (aligned without partition in the column direction) (for example 768 pixels). Therefore, compared to the number of the droplets to be jetted into the individual areas defined by the black matrix, the number of droplets jetted into an individual area according to the present invention is multiplied by the number of the pixels continuously aligned in the column direction. Additionally, where a certain unevenness of thickness of the film material 16 is tolerable (for example, 10%) there is a corresponding multiplication of the acceptable variation in quantity of applied film material. In other words, the required accuracy in the number of the droplets is inversely proportional to the number of the pixels continuously aligned in the column direction and forming an individual printed area.

Therefore, for attaining lower unevenness in the color density while attaining a good yield in production, it is preferable that the black matrix has such a pattern that the pixels are continuously aligned in the column direction. In the pattern of the black matrix 12 shown in FIG. 12(*a*), the spreading of the film material 16 jetted on is reduced but the flow of the film material 16 between adjacent pixels is not retarded. This arrangement attains a more even thickness of the film material 16 by allowing the film material 16 to flow between the pixels.

Here, it was evaluated how a distance between the protrusion sections 12*b* and the partition sections 12*a* adjacent thereto affected the application of the film material 16. The distance between the protrusion sections 12*b* and the partition sections 12*a* adjacent thereto was changed by changing a length of the protrusion sections 12*b* in the row direction. Other conditions were unchanged in the evaluation. Results of the evaluation showed that excellent application of the film material 16 was attained according to an arrangement in which the distance between the protrusion sections 12*b* and the partition section adjacent thereto was 5 µm or more. The film material in this example was a curing ink having a viscosity of 20 cps and in which a pigment was dispersed. According to this arrangement, the film material 16 could be applied, without causing the color mixing, in an even thickness of the film material 16 because the film material 16 is allowed to flow between pixels.

Figure 2:
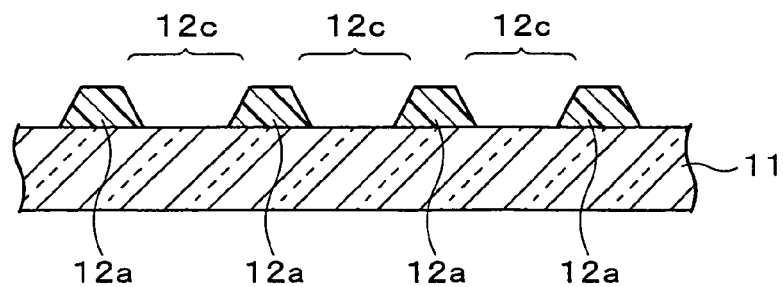
FIGS. 2(a) to 2(c) are cross sectional views illustrating manufacturing steps of the color filter shown in FIG. 1.
Figure 2:
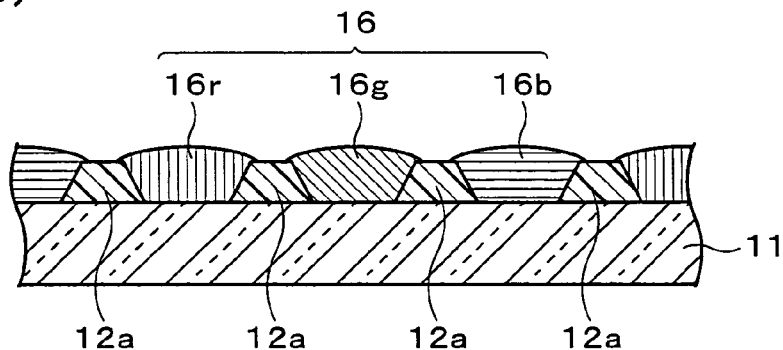
Figure 2:
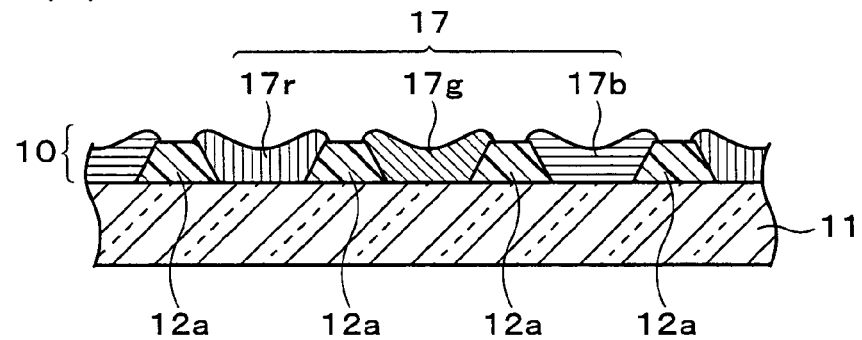

In the film material curing step, the substrate 11 on which the film material 16 is applied is thermally treated, so as to cure the film material 16 thereby forming the color sections 17 as shown in FIG. 2(*c*). Here, the substrate 11 was thermally treated at 180° C. for 90 minutes. Thereby, the color filter 10 is finished. Note that a protective layer or the like may be provided on the black matrix 12 and the color sections 17 if necessary.

As described above, the arrangement in which the corners of the protrusion sections 12*b* are curve-shaped (round, non-acute), allows the film material to flow without being obstructed, and prevents formation of air hole in the corners. Thereby, it is possible to form the color filter of high quality with a high production yield. The formation of air hole causes light leakage of the color filter 10.

Figure 23:
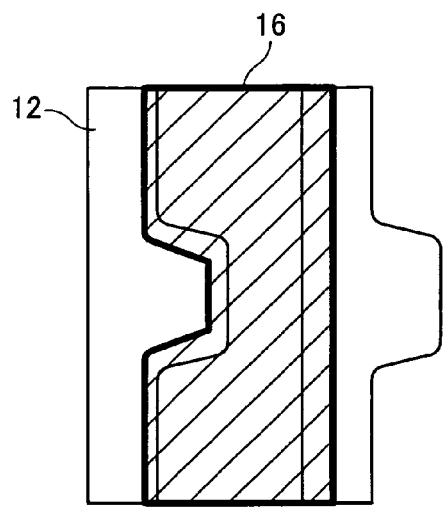
FIG. 23(a) is a plan view illustrating a film material right after applied in the first embodiment of the present invention.
FIG. 23(b) is a plan view illustrating a color section formed by curing the film material in the first embodiment of the present invention.
FIG. 23(c) is a plan view illustrating a film material right after applied in a comparative example.
FIG. 23(d) is a plan view illustrating a color section formed by curing the film material in the comparative example.
Figure 23:
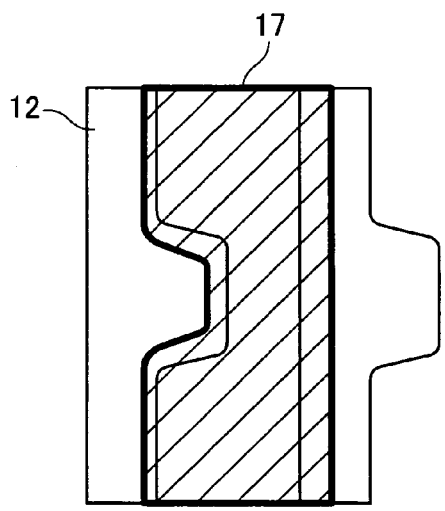
Figure 23:
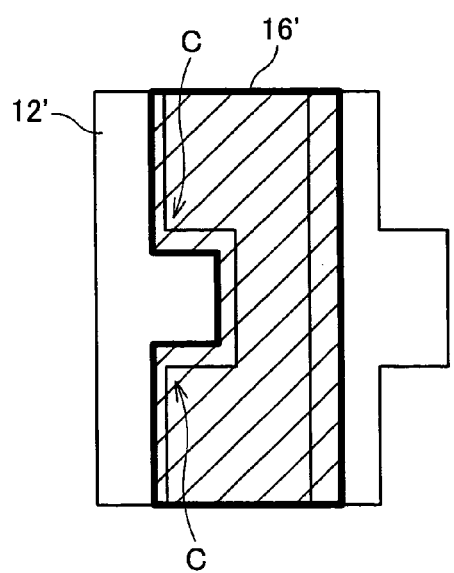
Figure 23:
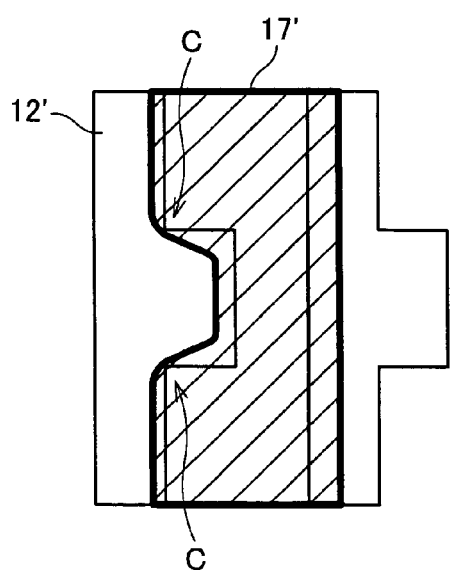

The following explains why the arrangement in which the corners of the protrusion sections 12*b* are curve-shaped can prevent the formation of the air hole, and the like, referring to FIGS. 23(*a*) to 23(*d*). FIGS. 23(*a*) and 23(*b*) illustrate the black matrix 12, the film material 16, and the color section 17 of the present embodiment. FIG. 23(*a*) shows a state right after the application of the film material 16. FIG. 23(*b*) shows a state where the color section 17 is formed by curing the film material 16. Moreover, FIGS. 23(*c*) and 23(*d*) illustrate a black matrix 12', a film material 16', and a color section 17' of a comparative example. FIG. 23(*c*) shows a state right after the application of the film material 16'. FIG. 23(*d*) shows a state where the color section 17' is formed by curing the film material 16'. In the comparative example, corners of protrusion section 12'*b* is rectangular-shaped, but not the curve-shaped.

As shown in FIGS. 23(*a*) and (*c*), right after being applied, the film materials 16 and 16' protrude from the gap regions depending on a amount of thereof and respectively overlap on the black matrixes 12 and 12'. Thereafter, in the film material curing step, the film materials 16 and 16' shrink due to surface tension. Especially, at angled corners C in the black matrix 12', shrinking of the film material 16' is greater. As a result, a shape of the film material 16' does not follow a shape of the black matrix 12' at the angled corners C. This causes the color section 17' to be thinner at the angled corners C, thus causing light leakage at the angled corners C. On the other hand, such angled corners are omitted by arranging such that corners of the protrusion sections 12*b* are round. In this way, it is possible to prevent the light leakage.

Figure 8:
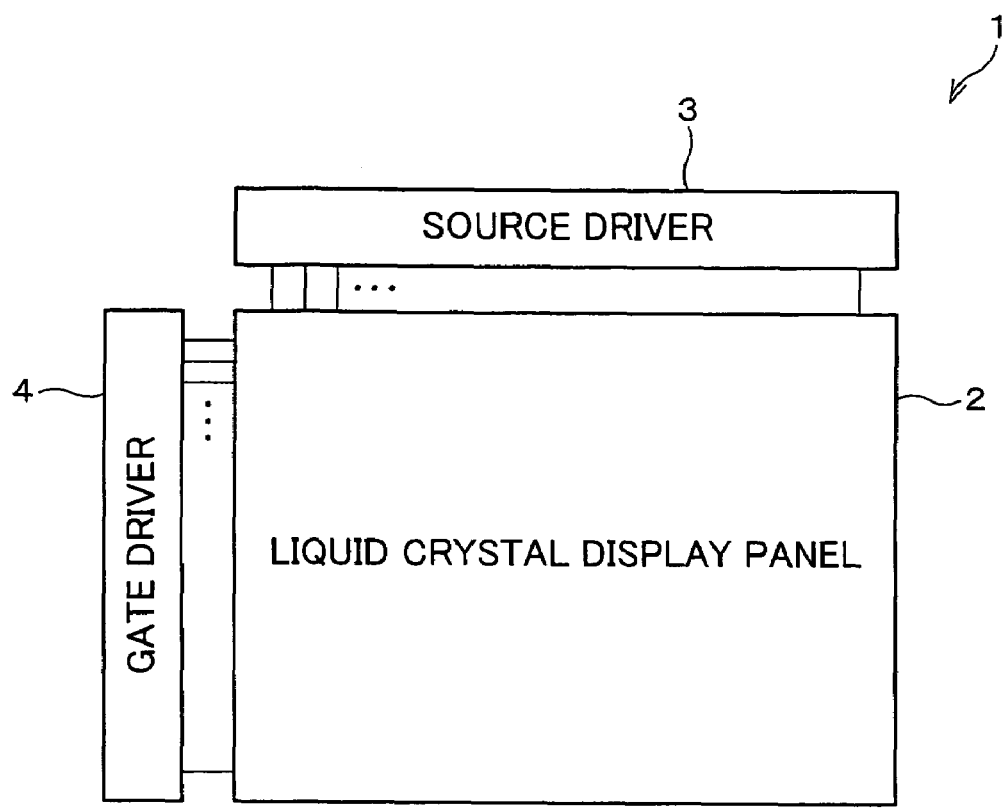
FIG. 8 is a plan view of a configuration of a liquid crystal display apparatus of the first embodiment of the present invention.

Next, as a display apparatus in which the color filter 10 is used, a liquid crystal display 1 is described below. The liquid crystal display 1 is, as shown in FIG. 8, provided with a liquid crystal display panel 2, a source driver 3, and a gate driver 4. Note that source driver 3 and the gate driver 4 are well known, and their explanation is omitted here. Here the liquid crystal display panel 2 is explained.

Figure 9:
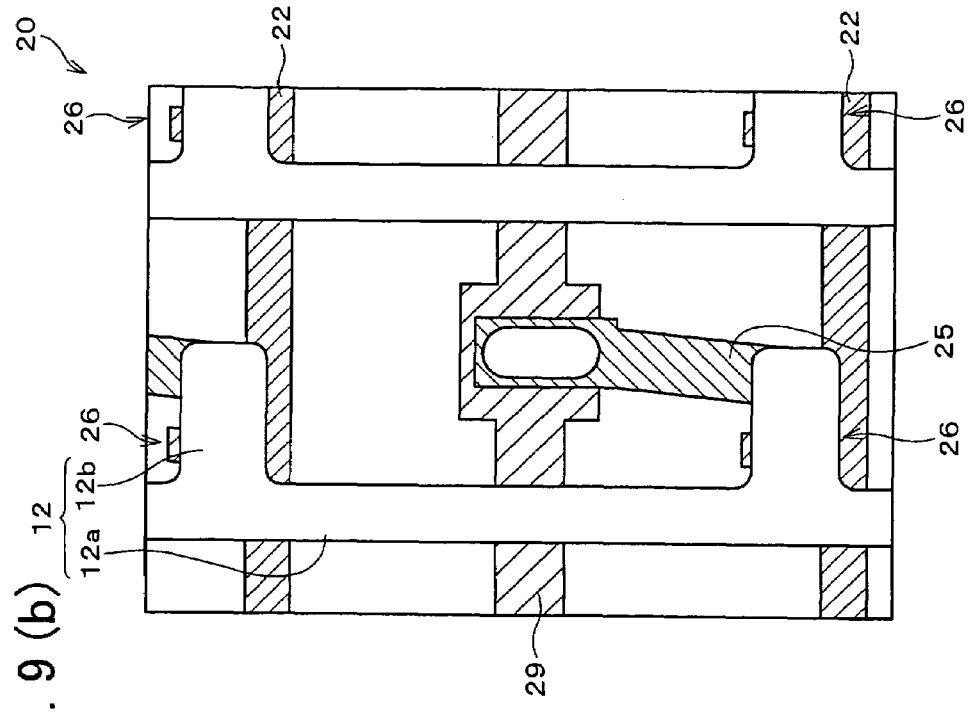
FIG. 9(a) is a plan view illustrating one pixel on an active matrix substrate of the liquid crystal display apparatus shown in FIG. 8.
FIG. 9(b) is a plan view in which a black matrix is superimposed on FIG. 9(a).
Figure 9:
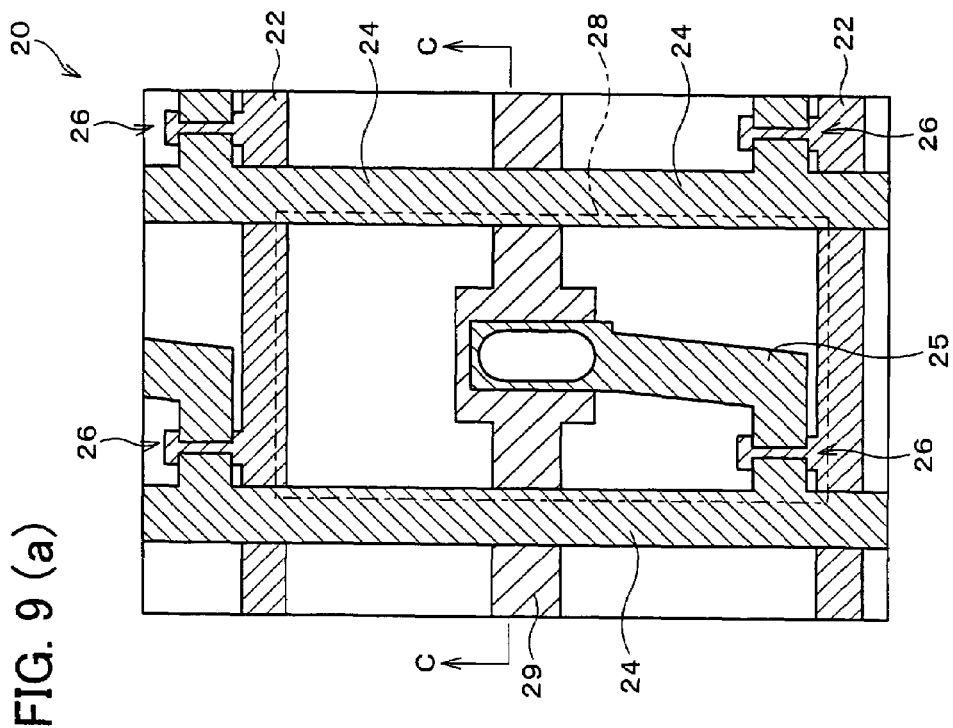
Figure 10:
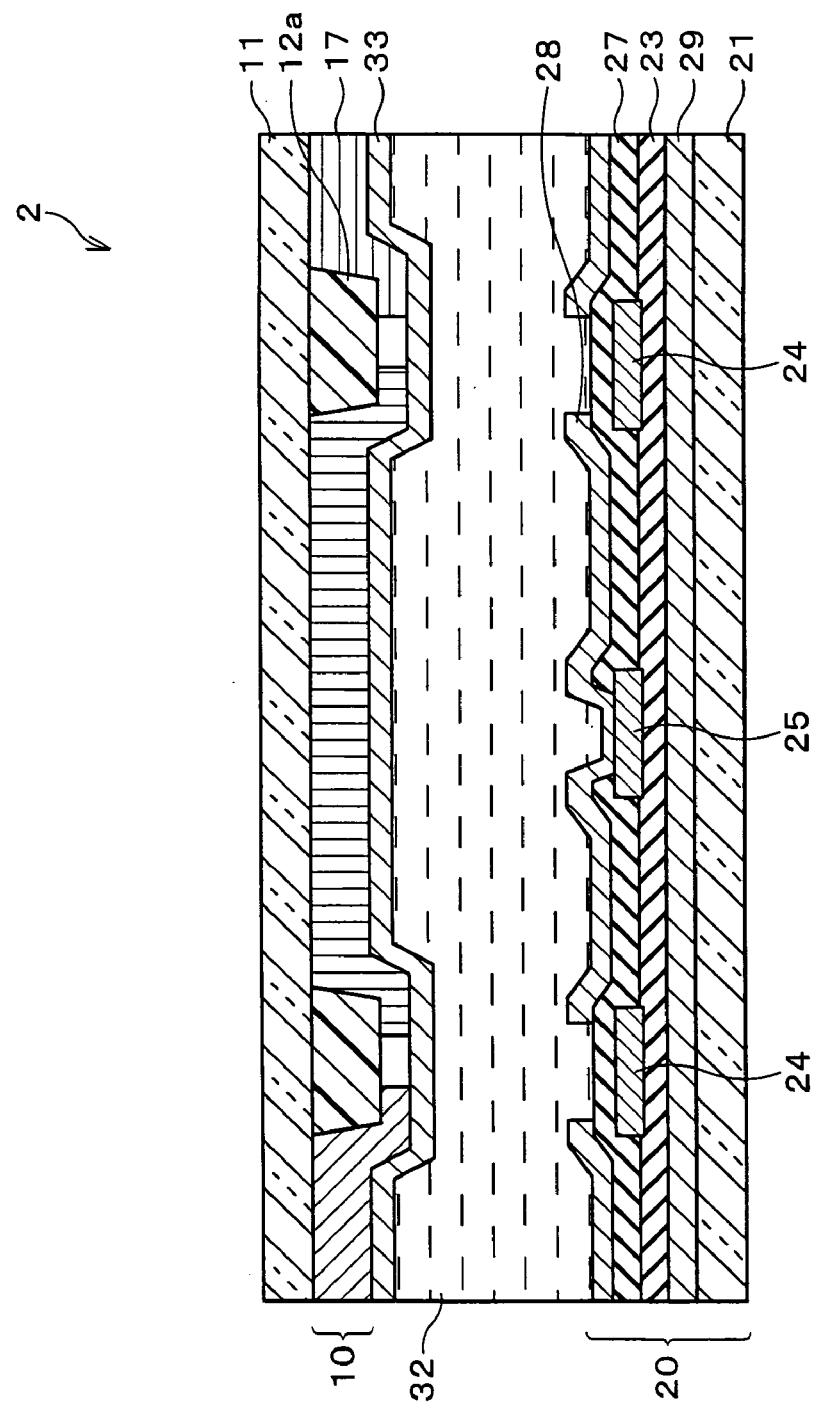
FIG. 10 is a cross sectional view of a liquid crystal display panel, taken on line C-C of FIG. 9(a).

The liquid crystal display panel 2 is provided with an active matrix substrate 20 shown in FIG. 9(*a*). Note that part of the active matrix substrate 20 which corresponds to one pixel is mainly shown in FIG. 9(*a*). Moreover, FIG. 10 illustrates a cross section of the liquid crystal display panel 2 taken on line C-C of FIG. 9(*a*).

In the liquid display panel 2, an active matrix substrate 20 is so provided as to face the color filter, and a liquid crystal layer 32 is provided between the color filter 13 and the active matrix substrate 20.

Note that the liquid display panel 2 is so configured that an ITO film is provided, as a common electrode 33, on a surface of the color filter 10. The ITO film is formed by the sputtering method or the like, and has a thickness of 140 nm for example.

The active matrix substrate 20 is provided with a substrate 21 made of glass or the like. On the substrate 21, the active matrix substrate 20 is provided with a gate bus line 22, a supplemental capacitor line 29, a gate insulating film 23, a source bus line 24, a drain outgoing line 25, a switching element 26, a protective film 27, a transparent pixel electrode 28.

The gate bus line 22 is provided on the substrate 21 and is connected with the gate driver 4. The gate insulating film 23, which is made of $SiN_x$, is provided on the gate bus line 22 and the substrate 21. The source bus line 24 is provided on the gate insulating film 23 and connected with the source driver 3. The drain outgoing line 25 is provided on the gate insulating film 23 so as to be on the same layer as the source bus line 24. The supplemental capacitor line 29 is so provided as to be on the same layer as the gate bus line 22. A supplemental capacitor is formed between the supplemental capacitor line 29 and the drain outgoing line 25. The switching element 26 is a TFT (Thin Film Transistor) or the like, which is constituted of part of the gate bus line 22, part of the source bus line 24, and a semiconductor film (not shown). The protective film 27 is provided on the gate insulating film 23, a source bus line 24, and a drain outgoing line 25, so as to protect the switching element 26. The transparent pixel electrode 28 is provided on the protective film 27 and functions as an electrode for display.

The liquid crystal display panel 2 performs display by using the liquid crystal layer 32 to control transmittance of light, that is, to control whether or not the light entered into the liquid crystal layer 32 from the substrate 21 is allowed to transmit through the liquid crystal layer 32 to the substrate 11. Here, the sections shaded in FIG. 9(a) shields light, thereby functioning as a light shielding area, whereas the sections not shaded in FIG. 9(a) functions as an opening area for controlling the transmittance of the light. The gate bus line 22, the source bus line 24, the drain outgoing line 25, the switching element 26, the supplemental capacitor line 29 are included in the light-shielding area. Moreover, the black matrix 12 of the color filter 13 is also the light-shielding area. In the liquid crystal display panel 2, it is preferable that a ratio of the light-shielding area is as small as possible and a ratio of the opening area is as large as possible, that is, an aperture ratio is as large as possible, in order to attain a display of high luminance.

In view of this, it is preferable that the light-shielding area of the active matrix substrate 20 and the black matrix 12 of the color filter 13 are positioned as shown in FIG. 9(b). That is, the liquid crystal display panel 2 is preferably so arranged that the protrusion sections 12b of the black matrix 12 superimpose on the switching elements 26 of the active matrix substrate 20 in a direction normal to the substrates 11 and 21. This arrangement can prevent or minimize reduction of the aperture ratio due to the provision of the protrusion sections 12b to the black matrix 12. Note that the partition sections 12a of the black matrix 12 are so positioned to superimpose on the source bus line 24, as in a general liquid crystal display panel.

In consideration of maximizing the aperture ratio of the liquid crystal display panel 2, it is more preferable that the protrusion sections 12b are provided only one side of partition sections 12a as shown in FIG. 1(a), compared with the arrangement in which the protrusion sections 12b are provided on both sides of the partition sections 12a as shown in FIG. 6.

Note that present embodiment discusses the color filter of the present invention. However, the present invention is not limited to the color filter. The present invention may be adopted to any composite film and a manufacturing method thereof, the composite film including (i) a first film having a plurality of partition sections extended, in one direction, along each other with a gap region therebetween, and (ii) a second film formed by applying a film material in the gap regions of the first film by the ink-jet method and curing the film material thus applied. In the color filter of the present embodiment, the black matrix 12 corresponds to the first film, whereas the color sections 17 correspond to the second film.

For example, the present invention may be adopted to a conductive wire that is formed by applying a conductive film material by the ink-jet method and then curing the film material thus applied. By using the manufacturing method of the present invention in order to manufacture the conductive wire, it is possible to form, for example, a stripe electrode that is to be a signal electrode or a scanning electrode for use in a passive matrix-type display panel, so as to manufacture an electrode substrate for use in the passive matrix-type display panel.

Moreover, by using the manufacturing method, it is possible to form a stripe electrode that is to be a scanning electrode for use in an active matrix-type display panel, especially an active matrix-type display panel having an MIM (Metal Insulator Metal) element as an active element, so as to manufacture an active matrix substrate.

As described above, the present invention may be used for (i) a pattern formation substrate on which a conductive or non-conductive pattern is to be formed by the ink-jet method, (ii) an electrode-attached substrate that is formed by providing the pattern formation substrate with an electrode, (iii) an active element-attached substrate that is formed by providing the pattern formation substrate with an active element, (vi) a color filter-attached substrate that is formed by providing the pattern formation substrate with a color filter.

As described above, the manufacturing method of the present invention is effective for manufacturing a composite film including a first film and a second film 1, the first film having a plurality of partition sections extended, in one direction, along each other with a gap region therebetween, and the second film being located in the gap region. The manufacturing method comprises the steps of forming the first film on a substrate; and applying a film material in the gap region by an ink-jet method by using an ink jet nozzle moving along the direction in which the partition sections are extended, and curing the film material thus applied, so at to form the second film. In the present embodiment, the black matrix formation step corresponds to the step of forming the first film, and the film material applying step and the film material curing step correspond to the step of applying the film material and curing the film material thus applied. Further, the present embodiment is so arranged that the first film has a gap width regulating section, by which a width of the gap region is partially narrowed.

In the manufacturing method, the second film is formed by applying, along the direction the partition section is extended, the film material into the gap region of the first film by the ink-jet method. Thereby, the composite film in which the second film is partitioned by the first film is manufactured.

In this method, it is preferable that the speed at which the film material is applied by the ink-jet method, that is, the relative velocity between the substrate and the ink jet nozzle for jetting out the film material, is large. However, in general, a high relative velocity causes such problems that the film material flows over the partition section, and/or the film material thus applied has an uneven film thickness. Such problems cause, in case of the color filter, color mixing and/or uneven color density, thus resulting in quality deterioration of the color filter.

As a solution to the problems, the first film has the gap width regulating section in the manufacturing method. The width of the gap region is partially narrowed by the gap width regulating section. In applying the film material, the gap width regulating section functions as a barrier portion against a film material flowing in the column direction in the gap regions. With this arrangement, it is possible to prevent the film material from flowing over the partition section and to attain lower unevenness in the film thickness of the film material thus applied. It is deduced that such effects are attained because the gap width regulating section causes the film material to spread at a slower rate or to spread less on the substrate after being applied thereon by jetting out from the ink jet nozzle.

According to the manufacturing method, as described above, it is possible to apply the film material at a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

Figure 11:
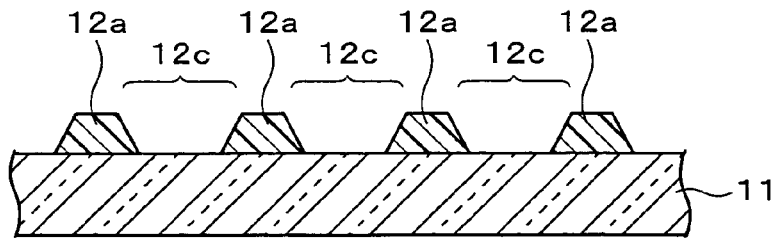
FIGS. 11(a) to 11(e) are cross sectional views illustrating manufacturing steps of a color filter of a second embodiment of the present invention.
Figure 11:
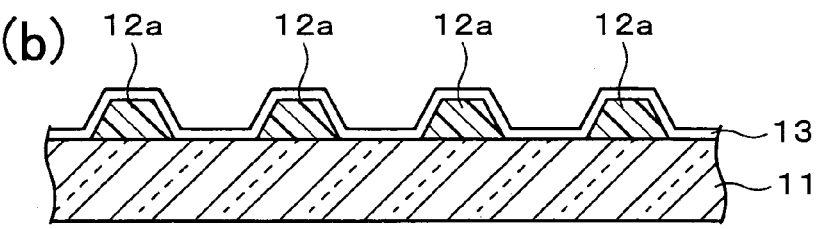
Figure 11:
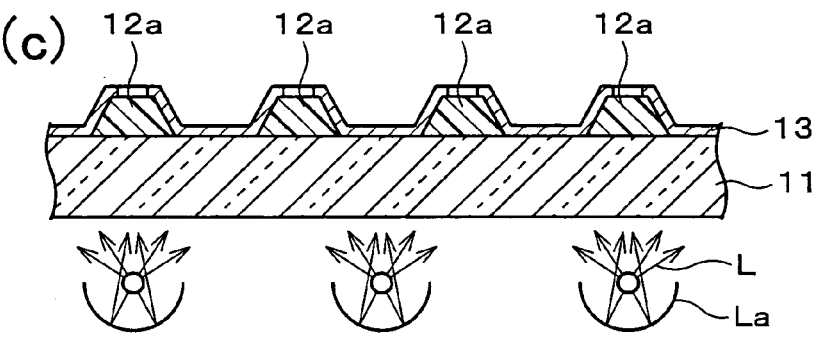
Figure 11:
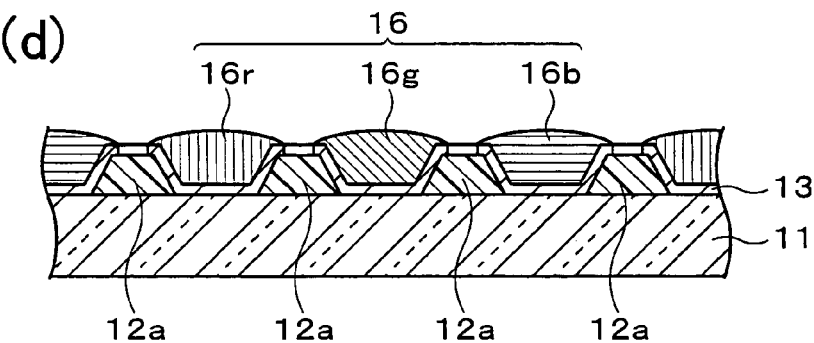
Figure 11:
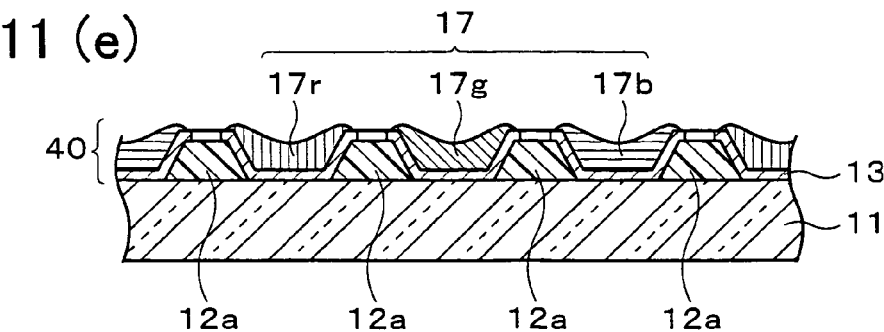
Figure 12:
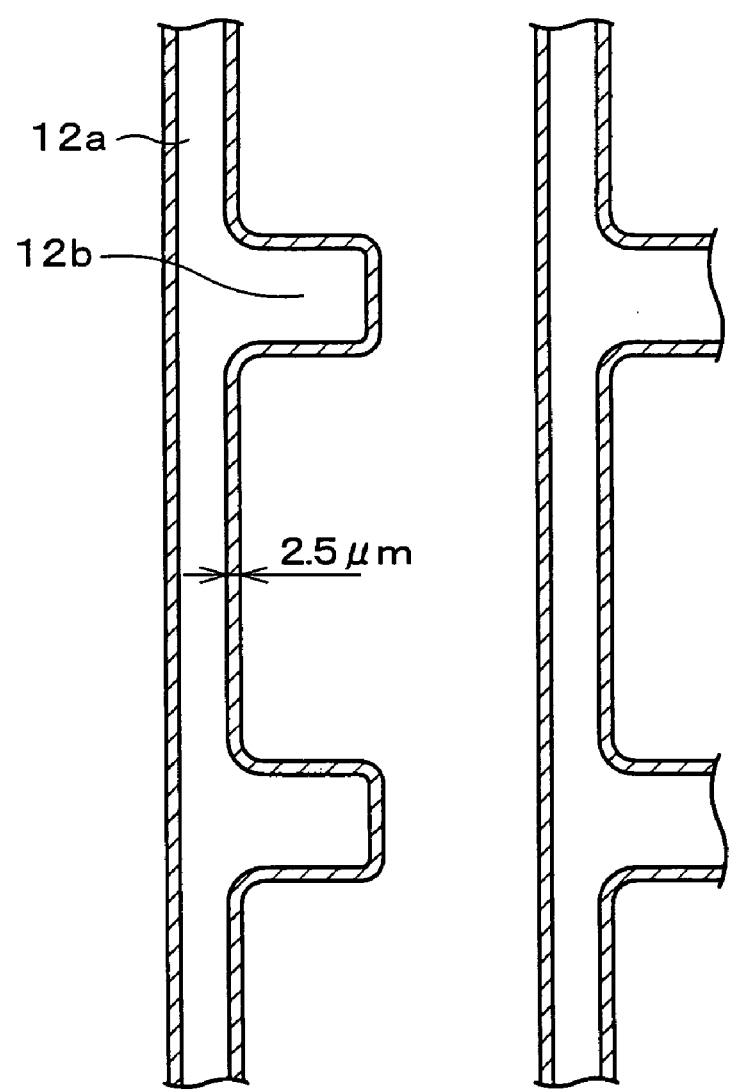
FIG. 12 is a plan view illustrating a hydrophilic region formed on the black matrix in the step shown in FIG. 11(c).

A second embodiment of the present invention is descried below referring to FIGS. 11 and 12.

As shown in FIG. 11(e), a color filter 40 of the present embodiment is different from the color filter 13 of the first embodiment in that a functional film 13 is provided on a black matrix 12 and in gap regions 12c. The functional film 13 is located above the black matrix 12 and below the color sections 17. Note that the color filter 40 of the present embodiment is provided with the same constituent elements as those of the color filter 10, apart from the functional film 13. Therefore, the same constituent elements are labeled in the same manner, and their explanation is omitted here.

The functional film 13 is a film whose wetting property with respect to a film material 16 is controllable. The functional film 13 is adjusted in terms of its wetting property, as follows: That part of the functional film 13 which is located on the black matrix 12 has a relatively low wetting property with respect to the film material 16. Other parts of the functional film 13, especially that part of the functional film 13 which is located in the gap regions 12c, has a relatively high wetting property. That part of the functional film 13 which has a relatively low wetting property is referred to as a non-affinity region hereinafter, whereas that part of the functional film 13 which has a relatively high wetting property, is referred to as an affinity region.

As the functional film 13, a photosensitive film, whose wetting property with respect to the film material 16 is improved by radiating a specific light on the photosensitive film, can be used. The use of such photosensitive film makes it possible to form the affinity region and the non-affinity region by radiating, in a specific pattern, the specific light on the functional film 13. Note that the specific light is light having a wavelength of a specific wavelength region.

Referring to FIGS. 11(a) to 11(e), a manufacturing method of the color filter 40 of the present embodiment is described below. In the manufacturing method, a black matrix forming step, a functional film forming step, an exposure step, a film material applying step, and a film material curing step are performed in this order. Note that the black matrix formation step (FIG. 11(a)), the film material applying step (FIG. 11(d)), and the film material curing step (FIG. 11(e)) are identical to the steps of the same names described in the first embodiment. Thus, their explanation is omitted here. Moreover, a color filter actually manufactured is described by mentioning a specific material used, specific dimensions, and the like. However, the present invention is not limited to the specific material used, dimensions, and the like thus mentioned.

In the functional film formation step (photosensitive film formation step), an application liquid was applied, by a spin-coating method, overall on that surface of the substrate 11 on which the black matrix 12 was formed. In this way, the application liquid was applied to a thickness of 0.3 μm. The application liquid used here contains a dispersion of titanium oxide ($TiO_2$) that was photo-catalytic. The substrate 11 on which the application liquid was applied was baked to dryness by baking for 120 seconds in an oven at 110° C. Thereby, a photosensitive resin film was formed as shown in FIG. 11(b). In this state, a top surface of the functional film 13 was so water-repelling that the surface makes a contact angle of 11° with respect to pure water. That is, the top surface of the functional film 13 had a relatively low wetting property in this state.

In the exposure step, as shown in FIG. 11(c), light L emitted from an extra-high pressure mercury lamp was used as the specific light. The specific light was directed from below a bottom side of the substrate 11 (that is, via the substrate 11) so as to expose the functional film 13 with the black matrix 12 used as an exposure mask. Here, an exposure intensity of the light L was 0.2 $J/cm^2$ as an integral light exposure amount at a wavelength of 365 nm. The substrate 11 is transparent with respect to the specific light, whereas the black matrix 12 shields the specific light (that is the black matrix 12 is not transparent with respect to the specific light). With this arrangement, that part of the functional film 13 which was located on the black matrix 12 became non-affinity region while the other part of the functional film 13 became the affinity region.

Note that the exposure was carried out by exposing the functional film 13 from below the bottom surface of the substrate 11 (back-side exposure) by using the black matrix 12 as the exposure mask. However, the exposure step may be so arranged that the functional film 13 is exposed from above a top surface of the substrate 12 (front-side exposure) by using a predetermined exposure mask. However, the back-side exposure is more advantageous because the black matrix 12 can be utilized as the exposure mask, whereby it becomes unnecessary that an additional exposure mask be prepared and the exposure be carried out by using the additional exposure mask after matching position of the additional exposure mask with the substrate 11.

Here, the light emitted from the extra-high pressure mercury lamp La was not parallel light but scattered light. With this arrangement, part of the light L is directed through the substrate 11 at an angle to the direction normal to the substrate to that part of the functional film 13 which was on the lateral side portions of the black matrix 12. Thus, it was possible to render, to be the affinity region, the parts of film 13 on the tapering sides thereof. Note that shaded part of the functional film 13 in FIGS. 11(c)-11(e) is the affinity region. Moreover, the shaded portion shown in FIG. 12 is "reach-around" affinity region on the side portions of black matrix 12 shown two-dimensionally. The "reach-around" affinity region is an area that cannot be reached by parallel light so as not to be affinity, but can be reached by scattering light so as to be affinity. The reach-around affinity region has a width of 2.5 μm from a border of "non"-reach-around affinity region (that can be reached even by parallel light so as to be affinity).

The arrangement in which the affinity region and the non-affinity region are formed as such effectively prevents color mixing of the film material 16 in applying the film material 16 in the next film material applying step. This is because the relative low wetting property of the non-affinity region with respect to the film material 16 inhibits the film material 16 from spreading in the row direction, the non-affinity region being formed on the black matrix 12, especially on partition sections 12a and protrusion sections 12b (see FIG. 1(a)).

As a result, it was possible to attain sufficiently small unevenness in color density and prevent color mixing, even if at a relative velocity Vh of the ink jet nozzle 91 with respect to the substrate 11 (see FIG. 4) was increased to 0.5 m/sec in the film material applying step. According to the present embodiment, as described above, it is possible to perform the application of the film material 16 with a higher relative velocity Vh than in the first embodiment, thereby improving productivity.

Note that the black matrix formation step, the functional film formation step, the exposure step, the film material applying step, and the film material curing step in the manufacturing method of the second embodiment correspond to the steps a to e described in THE BACKGROUND OF THE PRESENT INVENTION. Thus, the methods and raw materials described in the steps a to e may be used in the second embodiment. Note that the sections in the present embodiment correspond to those in THE BACKGROUND OF THE INVENTION as follows: The substrate 11 corresponds to the substrate 101; the black matrix 12 corresponds to the black matrix 102; the functional film 13 corresponds to the photosensitive layer 103; the affinity region corresponds to the hydrophilic region 104; the non-affinity region corresponds to the non-hydrophilic region 105; the film material 16 corresponds to the curing ink 106; and the color sections 17 corresponds to the color section 107.

Figure 13:
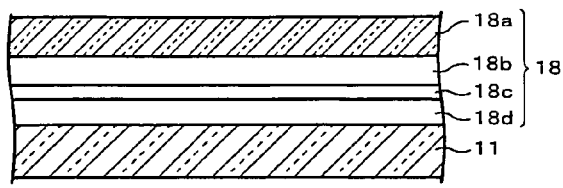
FIGS. 13(a) to 13(g) are cross sectional views illustrating manufacturing steps of a color filter of a third embodiment of the present invention.
Figure 13:
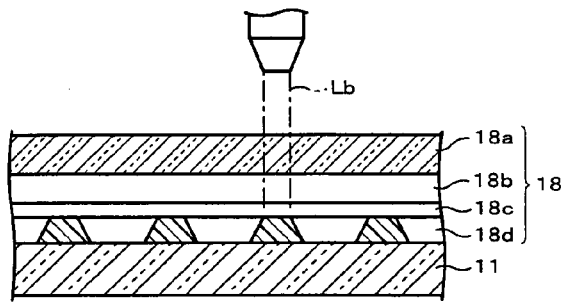
Figure 13:
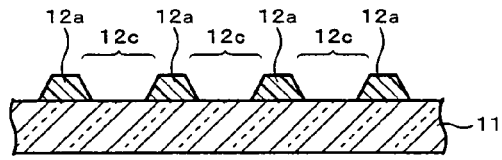
Figure 13:
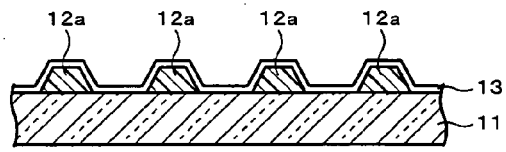
Figure 13:
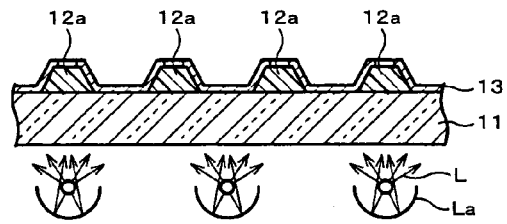
Figure 13:
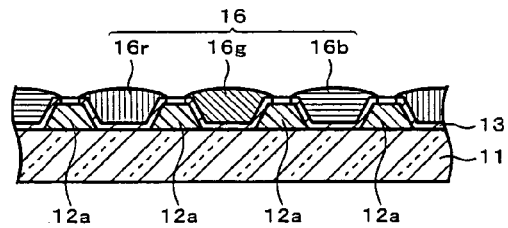
Figure 13:
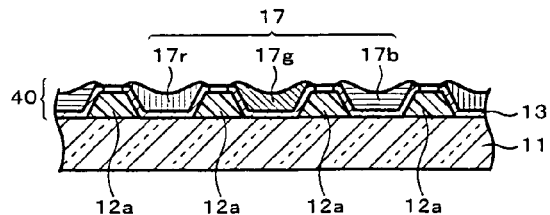

A third embodiment of the present invention is described below, referring to FIGS. 13 and 14.

A manufacturing method of the present embodiment is illustrated in FIGS. 13(a) to 13(g). The manufacturing method descried in the present embodiment is different from that of the second embodiment in terms of a black matrix formation step. The manufacturing method of the present embodiment is the same as that of the second embodiment in terms of the other steps, namely, a functional film formation step, an exposure step, a film material applying step, a film material curing step. Therefore, explanation of the other steps is omitted here. Note that the manufacturing method of the present embodiment may be so arranged as to be the same as that of the first embodiment in terms of the other steps other than the black matrix formation step, even though in the present embodiment the manufacturing method is the same as that of the second embodiment in terms of the steps other than the black matrix formation step.

In the black matrix formation step of the present embodiment, a black matrix 12 is formed by using a donor sheet 18. It is possible to adopt the method disclosed in EP 1,226,974 A1 in the black matrix formation step.

To begin with, the donor sheet 18 is descried below, referring to FIG. 14. The donor sheet 18 is used as an image giving element for transferring an image patterns onto a substrate 11 by using the thermal imaging process (LITI method) using a laser beam.

The donor sheet 18 is provided with a base material 18a, a light-to-heat converting layer 18b, an intermediate layer 18c, and a transfer layer 18d. The light-to-heat converting layer 18b, the intermediate layer 18c, and the transfer layer 18d are provided on the base material 18a in this order. The transfer layer 18d contains an image component. Heat generated by the light-to-heat converting layer 18b melts the image component in the transfer layer 18d, so as to transfer, in a pattern, the image component onto the substrate 11 (see FIG. 13(a)). An image pattern formed by transferring the image component becomes a black matrix 12 (see FIG. 13(c)).

In the donor sheet 18, the base material 18a may be made of any material, provided that requirements that the donor sheet 18 should have are satisfied. The base material 18a should have (i) transparency with respect to the laser beam, (ii) heat tolerance, (iii) and the like, because the donor sheet 18 is heated by radiating the laser beam for the transfer of the image component. Further, the base material 18a should have (iv) appropriate flexibility, (v) light weight, (vi) handleability, (vii) mechanical strength, and (viii) the like, because the donor sheet 18 is adhered on an image-receiving element and then peeled off from the image-receiving element after the transfer of the image component. Examples of appropriate material of the base material 18a are various plastic materials such as polyester resin. The base material 18a has a thickness in a range of about 0.01 mm to 2.54 mm.

The light-to-heat converting layer 18b (also referred to as an LTHC layer) converts into thermal energy light energy given by radiation of the laser beam. The thermal energy is conducted to the transfer layer 18d via the intermediate layer 18c, so as to melt the image component in the transfer layer 18d. The melted image component is transferred onto a surface of the substrate 11 and fixed thereon.

Therefore, it is preferable that the light-to-heat converting layer 18b is made of a light absorbing material, such as black carbon or the like. Alternatively, it is preferable that the light-to-heat converting layer 18b is a layer dispersedly containing such light absorbing material. Further, it is preferable that the light-to-heat converting layer 18b contains a photo-polymerizing component so that the light-to-heat converting layer 18b will be hardened by the radiation of the laser light. Examples of the light-to-heat converting layer 18b are a layer in which carbon black, photo-polymerizing monomers, a photo-polymerizing oligomer, a photo polymerizing initiator or the like is dispersed in a binder resin.

Such light-to-heat converting layer 18b are generally prepared as follows: a resin composition having a predetermined composition is applied on to the surface of the base material 18a, by a conventional applying method, such as the spin-coating method, gravure printing method, die coating method, and the like; then, the base material 18a on which the resin composition is applied is dried so as to form the light-to-heat converting layer 18b. The light-to-heat converting layer 18b has a thickness approximately in a range of 0.001 µm to 10 µm in general.

The intermediate layer 18c functions for evenly distributing the heat generated by the light-to-heat converting layer 18b as a result of the radiation of light. The intermediate layer 18c is made of a resin material having such a function. Similarly to the light-to-heat converting layer 18b, the intermediate layer 18c is prepared as follows: a resin composition having a predetermined composition is applied on to the surface of the light-to-heat converting layer 18b, by a conventional applying method, such as the spin-coating method, gravure printing method, die coating method, and the like; then, the light-to-heat converting layer 18b on which the resin composition is applied is dried so as to form the intermediate layer 18c. The intermediate layer 18c has a thickness approximately in a range of 0.05 µm to 10 µm in general.

The transfer layer 18d, as described above, contains the image component that is melted by the heat generated by the effect of the light-to-heat converting layer 18b, so as to be transferred, in a pattern, on the substrate 11.

The transfer layer 18d is made of a material that allows the image component contained in the material to be transferred, in a high contrast, onto the surface of the substrate 11 by the LITI method, and to be fixed as an image pattern after being transferred, and that allows the donor sheet 18 to be peeled off from the substrate 11 completely so that no part of the transfer layer 18d remains on the substrate 11. Moreover, the transfer layer 18d may contains (i) a black pigment (carbon black or the like) or other colored pigment in a large amount, in order to have the function of the black matrix 12 that is formed as the image pattern. Alternatively, the transfer layer 18d may contains metal powder or the like in order to have the function of the black matrix 12.

FIGS. 13(a) to 13(c) illustrate a method of forming the black matrix 12 by using the donor sheet 18.

Figure 14:
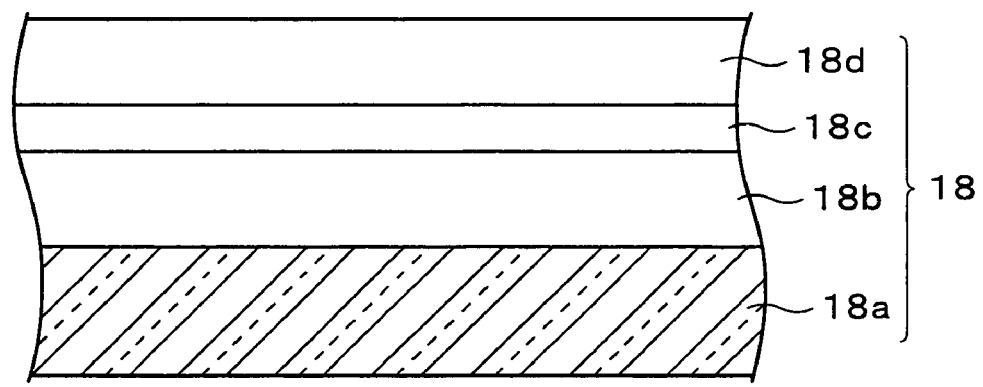
FIG. 14 is a cross sectional view illustrating an arrangement of a donor sheet for use in forming a black matrix by the steps shown in FIGS. 13(a) to 13(c).
Figure 15:
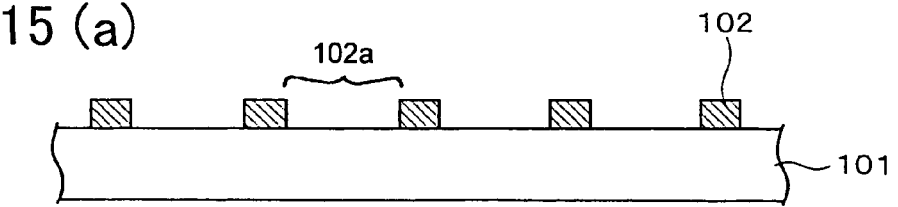
FIGS. 15(a) to 15(f) are cross sectional views illustrating manufacturing steps of a conventional color filter.
Figure 15:
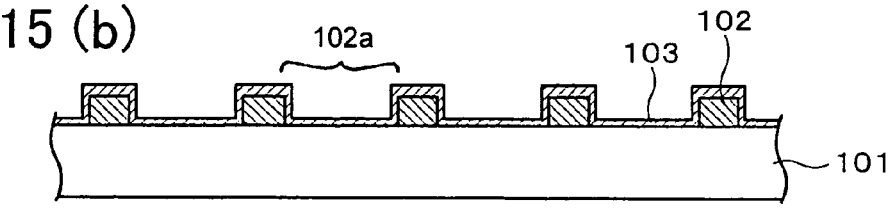
Figure 15:
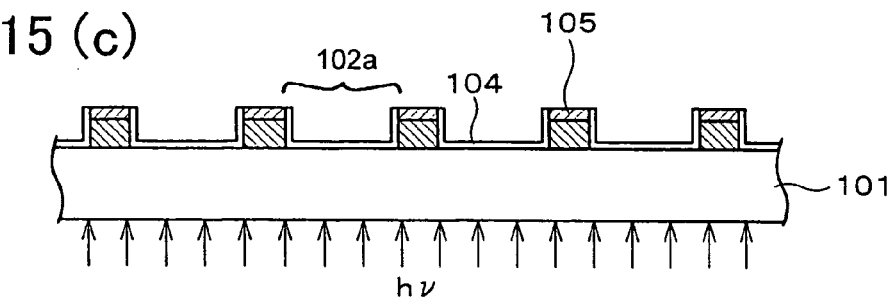
Figure 15:
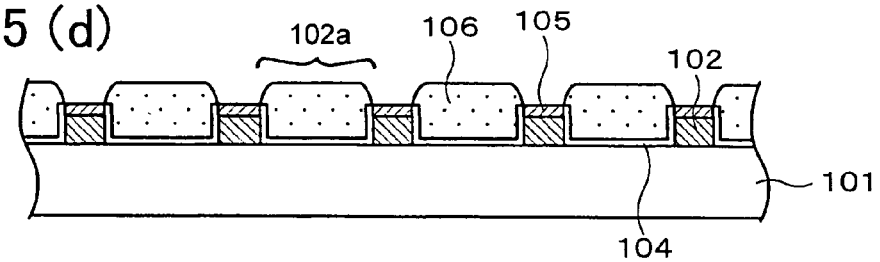
Figure 15:
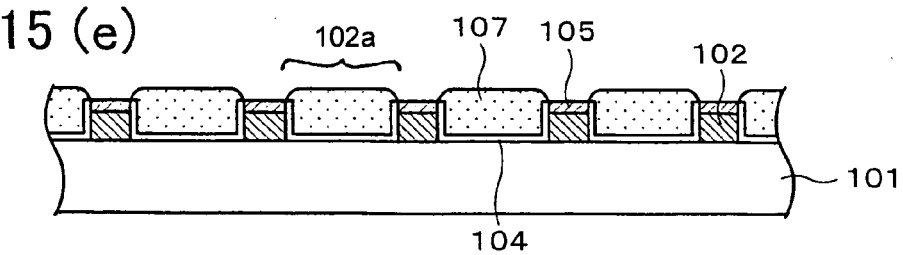
Figure 15:
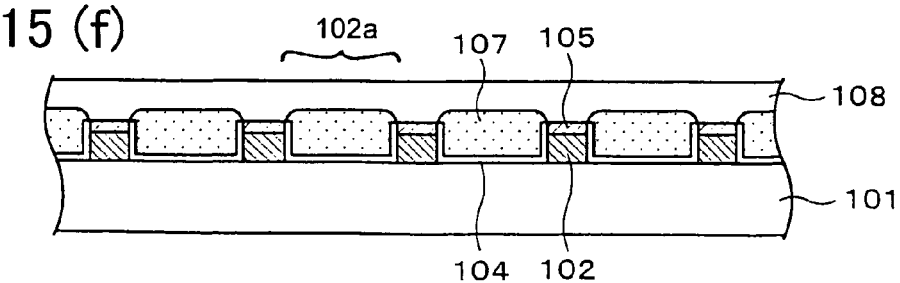
Figure 16:
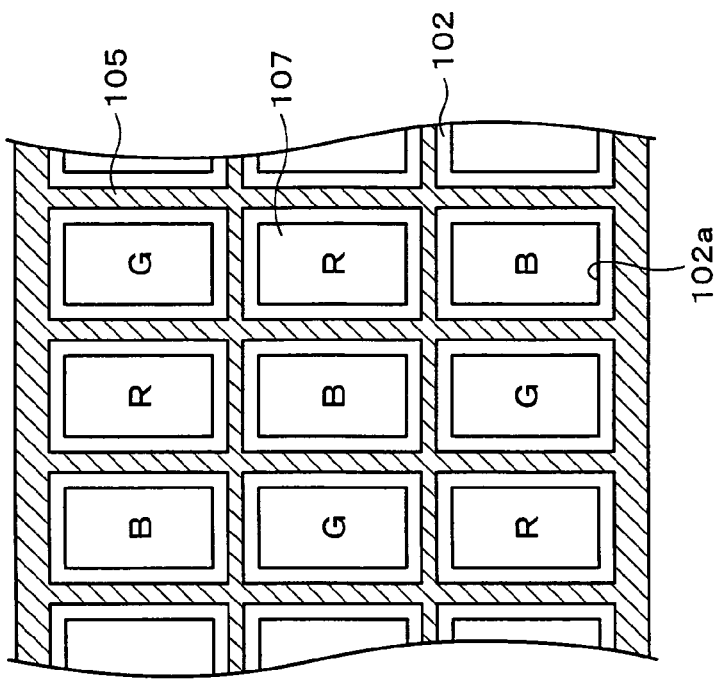
FIGS. 16(a) and 16(b) are plan views illustrating different patterns of non-hydrophilic regions formed on black matrix shaped in grid.
Figure 16:
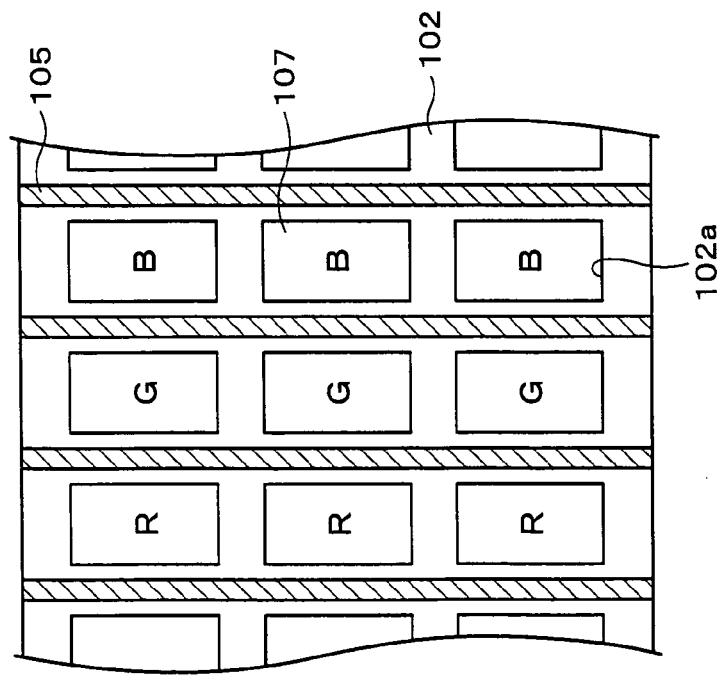
Figure 17:
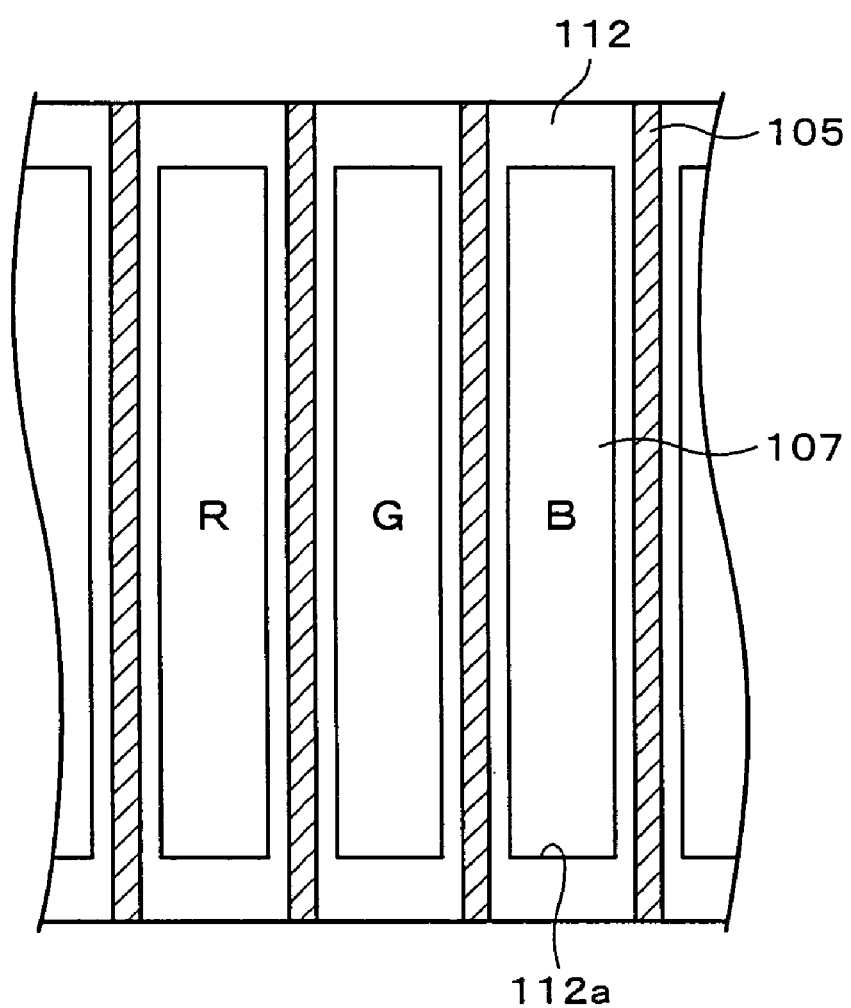
FIG. 17 is a plan view illustrating a black matrix having a shape different from those of the black matrixes shown in FIGS. 16(a) and 16(b), and non-hydrophilic regions formed on the black matrix.
Figure 18:
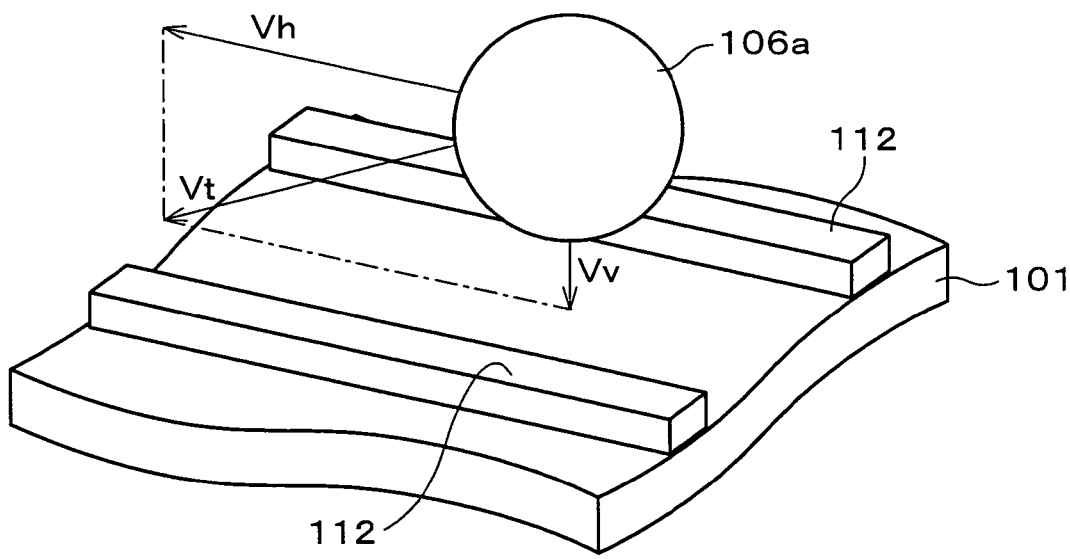
FIG. 18 is a perspective view for explaining velocity of a droplet of curing ink with respect to a substrate, in applying the curing ink by the ink-jet method.

As shown in FIG. 13(a), the donor sheet 18, which is shown in FIG. 14, is so placed on the substrate 11 that the transfer layer 18d is in a close contact with the surface of the substrate 11. Next, as shown in FIG. 13(b), a laser light Lb is radiated, in a predetermined pattern, onto the donor sheet 18 from above the substrate 18a (that is, via the substrate 18a). The pattern in which the laser light Lb is radiated corresponds to the pattern of the black matrix 12 that is to be formed.

As a result of the radiation of the laser light Lb, the light energy is converted into heat energy by the effect of the light-to-heat converting layer 18b of the donor sheet 18. Then, the heat energy is evenly distributed by the effect of the intermediate layer 18c. Thereby, the image component contained in the transfer layer 18d is heated and melted in the pattern. The melted image component is in close contact with the substrate 11. In FIG. 13(b), that part of the image component which is melted and is in close contact with the transfer layer 18d is indicated by shading.

Thereafter, the donor sheet 18 is peeled from the substrate 11, whereby the pattern corresponding to the pattern of the radiation of the laser light Lb is transferred on the substrate 11. The black matrix 12 is formed from the part thus transferred. In FIG. 13(c), the partition sections 12a of the black matrix 12 are shown.

Thereafter, the functional film formation step, the exposure step, the film material applying step, and the film material curing step, which are identical to those of the second embodiments, are carried out, thereby forming a color filter equivalent to the color filter 40 of the second embodiment.

The black matrix formation step does not require a removing step in which an alkali developer is used, whereas the black matrix formation step of the second embodiment requires such removing step. Thus, by adopting the black matrix formation step of the present embodiment, it is possible to simplify the process.

A fourth embodiment of the present invention is described below, referring to FIGS. 20 to 22.

Figure 20:
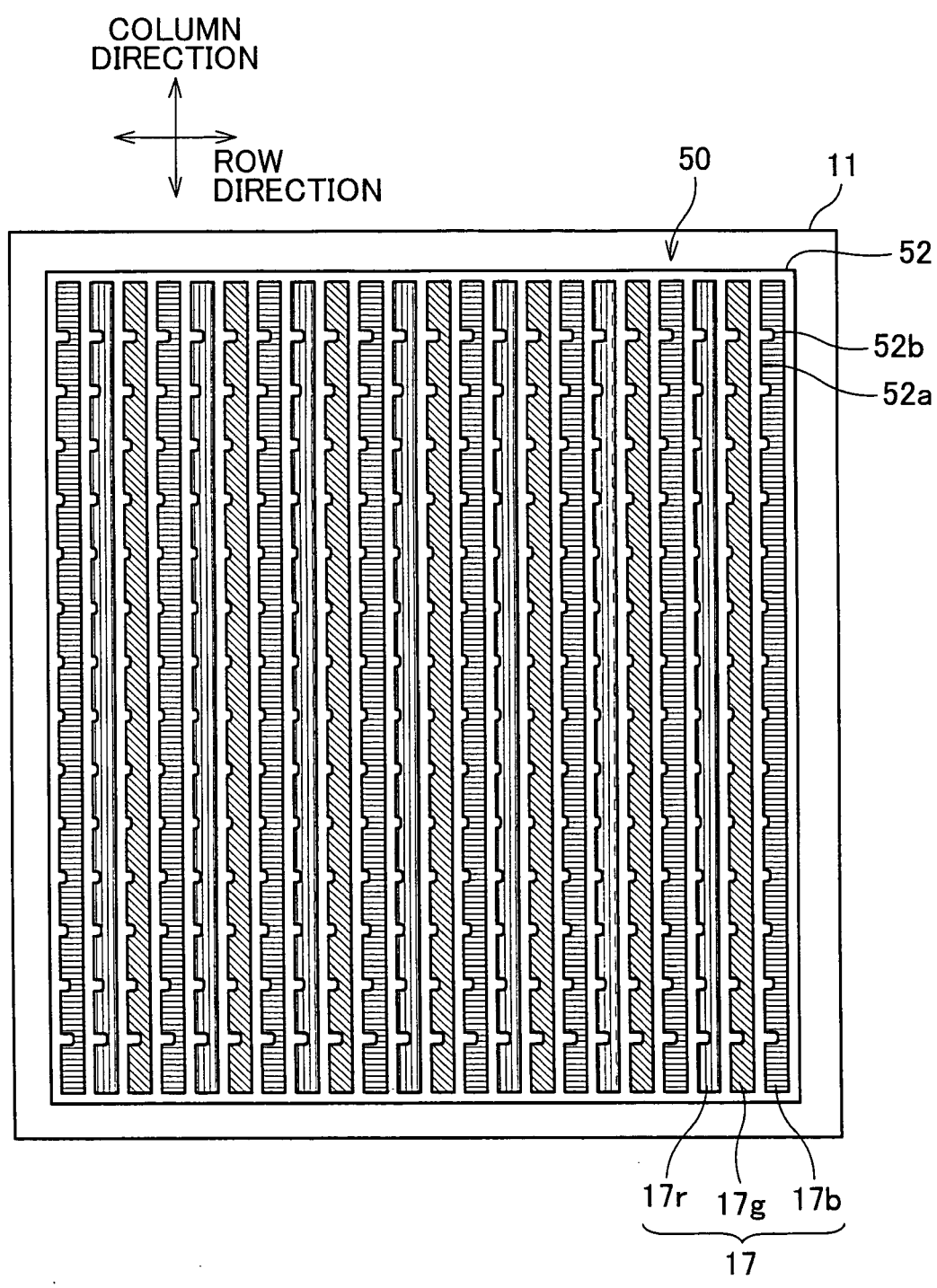
FIG. 20 is plan view illustrating a color filter of a fourth embodiment of the present invention.
Figure 21:
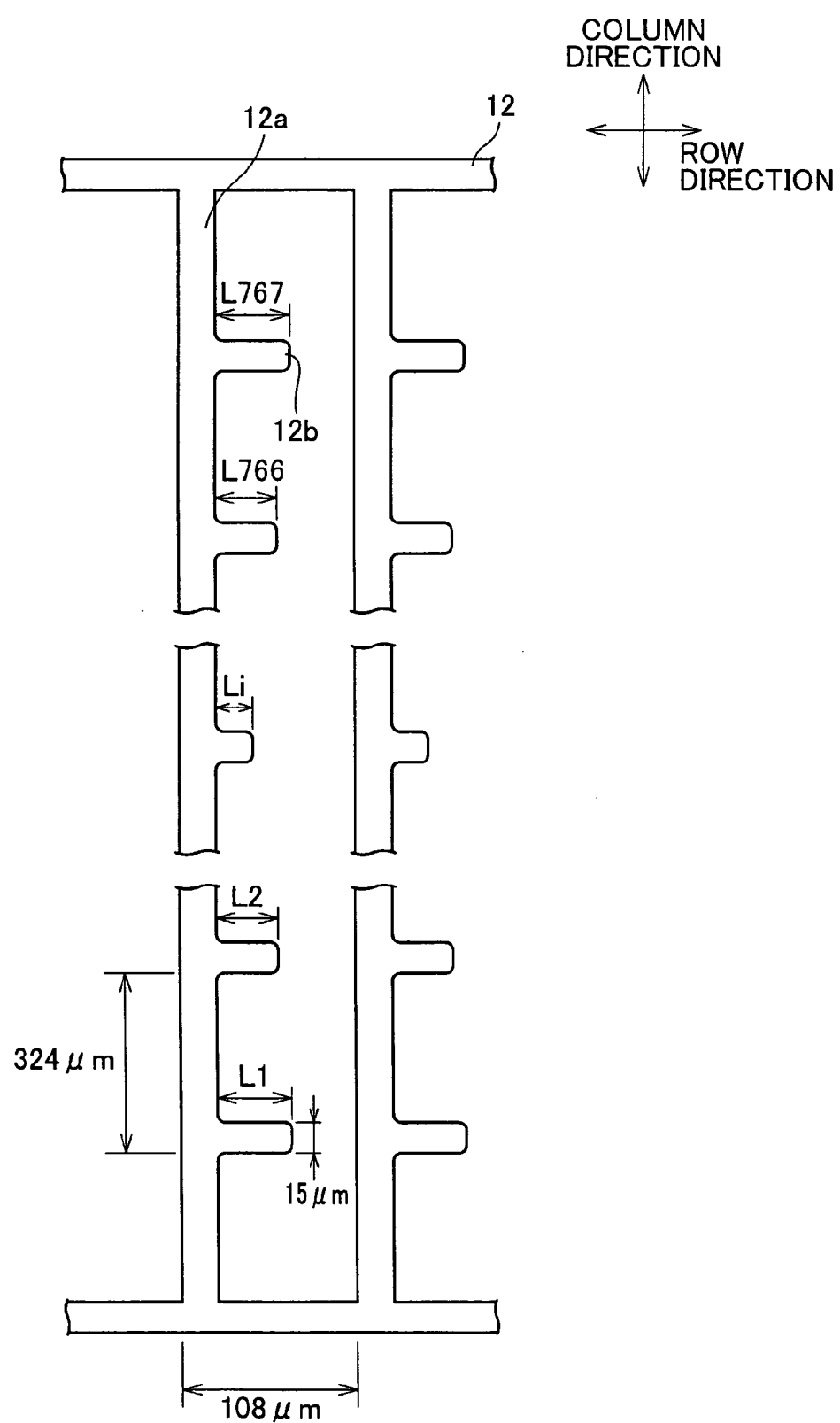
FIG. 21 is a plan view illustrating a black matrix of the color filter shown in FIG. 20.

FIG. 20 shows a color filter 50 of the present embodiment. The color filter 50 has a basic structure substantially same as that of the color filter 40 of the second embodiment. The color filter may be manufactured by a manufacturing method that is similar to that of the color filter 40. Thus, in the present embodiment, the constituent element of the color filter 50 that correspond to those of the color filter 40 are labeled in the same manner as in the second embodiment.

The following explain a difference between the color filter 50 of the present embodiment and the color filter 40 of the second embodiment. The color filter 40 of the second embodiment is so arranged that the protrusion sections 12b of the black matrix have the same shape regardless of where the protrusion sections are provided. On the other hand, the color filter 50 of the present embodiment is so arranged that protrusion sections 52b of the black matrix 52 have different shapes depending on where the black matrix 52 are located in terms of a column direction. That is, the protrusion sections 52b in edge parts are longer (has a longer protrusion length) than the protrusion sections 52b in a middle part. Note that partition sections 52a of the black matrix 52 have the same shape as the partition sections of the black matrix 12.

A specific example is explained below, referring to FIG. 21. Dimensions are only exemplary and should not be construed as limiting the invention. As shown in FIG. 21, sections of the black matrix 52 are sized as follows: the partition sections 52a have a width of 8 μm; the protrusion section 52b are 15 μm wide in the column direction; and the pixel pitches are 108 μm×324 μm in size, thereby forming pixels of 1024 (in a row direction)×768 (in a column direction). Note that the protrusion section 52b may be 13 μm in width in the column direction, in the exemplary embodiment.

A shape of the protrusion section 52b is so arranged that an i-th protrusion section 52b counted from one edge part has a length (protrusion length) Li (unit: μm) in a row direction, the length Li satisfying Equation (1).

$$\left.\begin{array}{ll} Li = 60 - (i-1) & (1 \le i \le 40) \\ Li = 20 & (41 \le i \le 727) \\ Li = 60 - (767 - i) & (728 \le i \le 767) \end{array}\right\}$$

In the other words, the protrusion section 52b in the middle part (Li) is shaped as 20 μm in the row direction×15 μm in the column direction in a plane view as illustrated. The protrusion sections 52b respectively located at each and (Li and L767 in the illustrated example) in the column direction are shaped as 60 μm in the row direction×15 μm in the column direction in a plane view. The protrusion lengths of the protrusion sections 52b become shorter by 1 μm from both the edge parts to the middle part. (One of adjacent protrusion sections 52b that is positioned closer to the middle than the other has a protrusion length shorter by 1 μm than that of the other.)

As descried above, the present embodiment is so arranged that widths of gap regions are narrowed in different ratios by the protrusion sections 52b by arranged such that protrusion lengths of the protrusion sections 52b are varied according to where the protrusion sections 52b are located in the column direction.

Note that the color filter 50 is so arranged that protrusion sections 52b have substantially rectangular shapes in a plane view (in a bird's eye view), and corners of the protrusion sections 52b are round. The color filter 50 is arranged as such in order to, as in the second embodiment, prevent the film material from unevenly flowing in applying the film material by the ink-jet method, thereby attaining lower unevenness in the film thickness.

A film material was applied, by using an ink jet nozzle, on a substrate 11 provided with such color filter 50. The film material actually used was curing ink in which a red pigment was dispersed and whose viscosity was adjusted to 20 cps.

The application of the film material was carried out by continuously jetting out droplets 16a of the film material from an ink jet nozzle 91 moved unidirectionally in the column direction with respect to the substrate 11. Specifically, the application film material was carried out as follows: the ink jet nozzle 91 was moved at a relative velocity Vh of 0.1 m/sec with respect to the substrate 11; the droplets 16a were jetted out from the ink jet nozzle 91 at a jetting velocity Vv of 0.6 m/sec in a jetting timing in which the droplets 16a were jetted at about 50 μm intervals as the ink jet nozzle 91 moved. Therefore, the droplets 16a were hit on the substrate 11 at a resultant velocity Vt that were combination of the relative velocity Vh and the jetting velocity Vv.

The present embodiment, like each of the embodiments discussed above, suppressed uneven color density that is due to unevenness in the thickness of the film material, and prevented color mixing that is due to flowing over of the film material.

After the film material was applied as such, the substrate was dried on a hot plate that was at 140° C., so as to evaporate off a solvent of the film material. Thereby, a red color section was formed.

Next, three types of color filter samples were prepared in order to evaluate effect of the provision of the protrusion sections 12b and 52b, effect of the protrusion sections 52 having various protrusion length. A first color filter sample was the color filter 50 of the present embodiment. A second color filter sample was the color filter 40 of the second embodiment. A third color filter sample was a color filter whose black matrix had no protrusion section.

Thickness (film thickness) of color sections formed by curing film material in each sample was evaluated. Results are shown in FIG. 22. FIG. 22 shows ratios of thickness of color sections in both edge parts(starting edges and an ending edges) in the column direction, with respect to the thickness of color section in a middle part, which was set as 1. Note that the starting edges are upstream edges of the color sections and the ending edges are downstream edges of the color sections, in a moving direction of the ink jet nozzle with respect to the substrate.

The color filter (the third color filter sample) whose black matrix had no protrusion section had such a very highly uneven film thickness that film thickness in the edge parts was about 2.5 to 3 times larger than in the middle part. On the other hand, the unevenness in the film thickness was very small in the color filter 50 (the first color filter sample) of the present embodiment, and the color filter 40 (the second color filter sample) of the second embodiment. Further, the first color filter has a smaller unevenness in the film thickness than the second color filter sample.

As described above, the arrangement in which the black matrix is provided with the protrusion sections can attain lower film thickness unevenness in the color sections. Further, more efficient reduction in film thickness unevenness can be attained by the arrangement in which the protrusion lengths of the protrusion sections are longer in the edge parts than in the middle part.

Moreover, according to the results shown in FIG. 22, it is clear that the color sections of all the sample tended to have a greater film thickness at the ending edge compared with the starting edge. It is deduced that an amount of the film material tends to be more toward the ending edge due to the inert force that the film material had when the film material hit on the gap region.

Therefore, it is preferable that the protrusion lengths of the protrusion sections close to the ending edge are longer than the protrusion lengths of the protrusion sections close to the starting edge. This arrangement further attain lower film thickness unevenness in the color sections.

Note that the specific example described in the present embodiment is merely an example. Thus, the present invention is not limited to Equation (1) as to the protrusion length of the protrusion sections 52$b$, provided that the protrusion lengths are longer at the ends of the column direction than in the middle part of the column. Substantially the same effect can be obtained by making the protrusion sections 52$b$ that are located toward the ends of the column longer than the middle protrusion sections 52$b$ by other ratios.

Moreover, the present embodiment discusses the arrangement in which the color filter used here is similar to the color filter 40 of the second embodiment 2 but is modified by providing the black matrix 52 with the protrusion sections 52$b$ whose protrusion lengths are varied. However, the present invention is not limited to this arrangement. A similar effect can be attained by modifying, in the same way, the color filter 13 shown in FIGS. 1, 6, and 7 of the first embodiment, and the color filter 40 of the third embodiment shown in FIG. 13.

In case of the color filter 13 shown in FIG. 6 of the first embodiment, the protrusion sections 12$b$ protruded from the partition sections 12$a$ of one side may have various protrusion lengths, or the protrusion sections 12$b$ protruded from the partition sections 12$a$ of both sides may have various protrusion lengths. Moreover, in case of the color filter 13 shown in FIG. 7 of the first embodiment, the row-direction widths of the island-shaped sections 12$b'$ may be varied in the same manner as the protrusion length of the protrusion section 12$b$.

The present embodiment discusses the color filter of the present invention. However, like each embodiment discussed above, the present invention is not limited to the color filter. The present invention may be adopted to any composite film and a manufacturing method thereof, the composite film including (i) a first film having a plurality of partition sections extended, in one direction, along each other with a gap region therebetween, and (ii) a second film formed by applying a film material in gap regions of the first film by the ink-jet method and curing the film material thus applied. In the color filter of the present embodiment, the black matrix 52 corresponds to the first film, whereas the color sections 17 correspond to the second film.

As described above, a method of the present invention for manufacturing a composite film may be so arranged that the first film has, in the direction in which the partition section is extended, a plurality of the gap width regulating sections, such as the protrusion section, the island-shaped section, and the like, the gap width regulating sections located in edge parts of the gap region causing the width of the gap region to be narrower than do the gap width regulating sections located in a middle part of the gap region.

The film thickness of the second film tends to be thicker in the edge parts than in the middle part, in the direction in which the partition section is extended. It is deduced that the film thickness of the second film is as such because the film material dries at a higher rate in the edge parts than in the middle part, thereby causing the film thickness to flow to the edge parts from the middle in which the film material dries relatively slower.

In order to solve this problem, the flow of the film material from the middle part to the edge parts can be retarded by the arrangement in which the gap width regulating sections located in edges of the gap region causes the width of the gap region to be narrower than do the gap width regulating sections located in a middle part of the gap region, as described above. As a result, it is possible to alleviate the tendency for the film thickness of the second film to be thicker in the edge parts than in the middle part. Thereby, it is possible to attain more even film thickness of the second film.

Note that the second film may be so arranged that the gap width regulating sections positioned farer from the middle cause the width of the gap region to be narrower than do the gap width regulating sections positioned closer to the middle.

Further, the method of the present invention for manufacturing a composite film may be so arranged that the gap width regulating sections positioned in one edge part cause the width of the gap region to be narrower than do the gap width regulating sections positioned in the other edge part, and the film material is applied from the other edge part to the one edge part in the step of applying the film material and curing the film material.

In applying the film material by the ink-jet method, there is a tendency that, depending on the relative velocity between the ink jet nozzle and substrate, the film material becomes thicker in a downstream of the direction (moving direction of the ink jet nozzle) in which the ink jet nozzle moves.

In order to solve this problem, the flow of the film material from the upstream to the downstream of the moving direction of the ink jet nozzle can be retarded by the arrangement in which the gap width regulating sections positioned in the downstream direction cause the width of the gap region to be narrower than do the gap width regulating sections positioned in the upstream direction. As a result, it is possible to alleviate the tendency for the film thickness of the second film to be thicker in the downstream than in the upstream. Thereby, it is possible to attain more even film thickness of the second film.

The present invention may be descried as follows as well. Aligned walls are formed on a substrate on which a pattern is to be formed. The walls have four round corners and a plurality of protrusions or islands. The protrusions or islands function as "breakwaters" so as to reduce flow speed of the droplets hit (jetted) on the substrate, while allowing part of the droplets to flow into pixels located nearby. In this way, even film thickness overall is attained. Especially, in case of the formation of the color filter, it is preferable that the walls are made of a resin material that shields light, and the protrusions or island are superimposed on light-shielding sections of the switching elements.

Further, in order to attain even film thickness after drying, the protrusions and islands are varied in size in such a manner that the protrusions or islands positioned closer to ends of column are larger in size. Thereby, an ink material is still allowed to flow into adjacent pixels but the flow is more limited at the ends of a column-shaped printed area than at the middle thereof. In this way, it is possible to prevent the film thickness from being thicker at the ends after drying. Moreover, because the substrate moves relatively with respect to the ink jet head, the ink material has an initial velocity in a scanning direction. Because of this, the ink material tends to accumulate more at a position where the applying is ended, than at a position where the applying is started. However, even film thickness can be attained providing protrusions or islands at the ends of a column are larger in size than the protrusions or islands at the middle.

The present invention may be suitably adopted to a color filter for use in a liquid crystal display apparatus or the like. Further, the present invention may be used for a conductive wire, an electrode, and the like, with which a display apparatus of the passive matrix type or the active matrix type is provided.

The present invention is not limited to those embodiment described above, and may be modified within the scope of the claims recited below. The technical scope of the present invention includes any embodiment attained by appropriately combining technical means disclosed in the different embodiments.

As described above in the embodiments, a method of the present invention of manufacturing a composite film including a first film and a second film, the first film having a plurality of partition sections extended, in one direction, along each other with a gap region therebetween, and the second film being located in the gap region, the method comprising the steps of: (i) forming the first film on a substrate; and (ii) applying a film material in the gap region by an ink-jet method along the direction in which the partition sections are extended, and curing the film material thus applied, so as to form the second film, the first film having a gap width regulating section, by which a width of the gap region is partially narrowed.

In the method, the second film is formed by applying the film material, along the direction in which the partition section is extended, into the gap region of the first film by the ink-jet method. Thereby, the composite film in which the second film is partitioned by the first film is manufactured. For example, this method can be suitably used for manufacturing a composite film, such as a color filter that has a light-shielding film that corresponds to the first film, and a transparent color film that corresponds to the second film.

In this method, it is preferable that the speed at which the film material is applied by the ink-jet method, that is, the relative velocity between the substrate and the ink jet nozzle for jetting out the film material is large. However, in general, a high relative velocity causes such problems that the film material flows over the partition section, and/or the film material thus applied has an uneven film thickness. Such problems cause, in case of the color filter, color mixing and/or uneven color density, thus resulting in quality deterioration of the color filter.

As a solution to the problems, the first film has the gap width regulating section in the manufacturing method. The width of the gap region is partially narrowed by the gap width regulating section. In applying the film material, the gap width regulating section functions as a drag portion against a film material flowing in the column direction in the gap regions. With this arrangement, it is possible to prevent the film material from flowing over the partition section and to attain lower unevenness in the film thickness of the film material thus applied. It is deduced that such effects are attained because the gap width regulating section causes the film material to spread at a slower rate or to spread less on the substrate after being applied thereon by jetting out from the ink jet nozzle.

According to the manufacturing method, as described above, it is possible to apply the film material with a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

Note that the method may be so arranged that the gap width regulating section is a protrusion section, which is that part of the partition section which is protruded into the gap region. Alternatively, the method may be arranged such that the gap width regulating section is an island-shaped section of the first film, the island-shaped section being isolated from the partition section.

Moreover, it is preferable that the gap width regulating section has a corner section in a plane view, the corner section being round. By arranging such that the gap width regulating section has a round corner section in a plane view, it is possible to inhibit the film material from flowing unevenly and to attain lower unevenness in the film thickness of the film material.

The method of the present invention may be so arranged that the first film has, in the direction in which the partition section is extended, a plurality of the gap width regulating sections, the gap width regulating sections located in edge parts of the gap region, cause the width of the gap region to be narrower than do the gap width regulating sections located in a middle part of the gap region.

The film thickness of the second film tends to be thicker in the edge parts than in the middle part, in the direction in which the partition section is extended. It is deduced that the film thickness of the second film is as such because the film material dries at a higher rate in the edge parts than in the middle part, thereby causing the film material to flow to the edge parts from the middle part in which the film material dries relatively slower.

In order to solve this problem, the flow of the film material from the middle part to the edge parts can be retarded by the arrangement in which the gap width regulating sections located in edges of the gap region causes the width of the gap region to be narrower than do the gap width regulating sections located in the middle part of the gap region, as described above. As a result, it is possible to alleviate the tendency for the film thickness of the second film to be thicker in the edge parts than in the middle part. Thereby, it is possible to attain more even film thickness of the second film.

Note that the present invention may be arranged such that the gap width regulating sections positioned farer from a middle of the gap region the width of the gap region to be narrower than do the gap width regulating sections positioned closer to the middle.

Further, the method of the present invention may be arranged such that the gap width regulating sections positioned in one edge part cause the width of the gap region to be narrower than do the gap width regulating sections positioned in the other edge part, and the film material is applied from the other edge part to the one edge part in the step of applying the film material and curing the film material.

In applying the film material by the ink-jet method, there is a tendency that, depending on the relative velocity between the ink jet nozzle and substrate, the film material becomes thicker in a downstream of the direction (moving direction of the ink jet nozzle) in which the ink jet nozzle moves.

In order to solve this problem, the flow of the film material from the upstream to the downstream of the moving direction of the ink jet nozzle can be retarded by the arrangement in which the gap width regulating sections positioned in one edge part cause the width of the gap region to be narrower than do the gap width regulating sections positioned in the other edge part. As a result, it is possible to alleviate the tendency for the film thickness of the second film to be thicker in the downstream than in the upstream. Thereby, it is possible to attain more even film thickness of the second film.

The method of the present invention may be so arranged as to include, prior to the step of applying the film material and curing the film material, the step of: forming a photosensitive film on the substrate on which the first film has been formed, the photosensitive film being more wettable with respect to the film material by radiating specific light onto the photosensitive film; radiating the specific light onto the photosensitive film, so as to cause that part of the photosensitive film which is on the first film, to be relatively less wettable, and to cause that part of the photosensitive film which corresponds to the gap region, to be relatively more wettable.

According to the method, the relatively less wettable region formed on the first film more effectively prevents the film material from flowing over the partition section. Because of this, it is possible to apply the film material with a higher relative velocity between the ink jet nozzle and the substrate, thus attaining higher productivity.

The method may be so arranged that the substrate is transparent with respect to the specific light, and the first film shields the specific light, and in the step of radiating the specific light, the specific light is radiated from above the substrate onto the photosensitive film while using the first film as a mask.

In the method, the first film can be used as a mask in the exposure using the specific light. Thus, it becomes unnecessary that an additional exposure mask be prepared and the exposure be carried out by using the additional exposure mask after matching position of the additional exposure mask with the substrate.

The method of the present invention may be so arranged that, in the step of forming the first film, a thermal imaging process using a laser beam is adopted so as to form the first film on the substrate.

In the method, it is possible to form the first film without using a mask for use in exposure. Moreover, a development step after exposure may be omitted in this method. Thereby, it is possible to simplify the step of forming the first film.

A composite film of the present invention is provided with (i) a first film having a plurality of partition sections extended, in one direction, along each other with a gap region therebetween, and (ii) a second film formed by applying a film material in the gap region by an ink-jet method and curing the film material, the first film having a gap width regulating section, by which a width of the gap region is partially narrowed.

The composite film arranged as above can be manufactured by the above method. Thus, as described above, the composition can be manufactured by applying the film material at a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

The composite film of the present invention may be arranged such that the gap width regulating section is a protrusion section, which is that part of the partition section which is protruded into the gap region. Alternatively, the composite film of the present invention may be arranged such that the gap width regulating section is an island-shaped section of the first film, the island-shaped section being isolated from the partition section.

The composite film of the present invention may be arranged such that the first film has, in the direction in which the partition section is extended, a plurality of the gap width regulating sections, the gap width regulating sections located in edge parts of the gap region, cause the width of the gap region to be narrower than do the gap width regulating sections located in a middle part of the gap region.

The arrangement alleviates tendency for the second film to have a thicker film thickness at the edge parts than at the middle, thus attaining more even film thickness of the second film.

The composite film of the present invention may be so arranged that the gap width regulating sections positioned farer from a middle of the gap region the width of the gap region to be narrower than do the gap width regulating sections positioned closer to the middle.

Further, the composite film of the present invention may be so arranged that the gap width regulating sections positioned in one edge part cause the width of the gap region to be narrower than do the gap width regulating sections positioned in the other edge part, and the film material is applied from the other edge part to the one edge par tin the step of applying the film material and curing the film material.

The arrangement alleviates tendency for the second film to have a thicker film thickness in the downstream than in the upstream of applying the film material by the ink-jet method. As a result, more even film thickness of the second film is attained.

The composite film of the present invention may further include a functional film, above the first film and below the second film, the functional film being controllable in terms of wetting property with respect to the film material, the functional film having relatively less wettable part that is on the first film, and relatively more wettable part that corresponds to the gap region.

In the composite film arranged as above, the relatively less wettable region formed on the first film more effectively prevents the film material from flowing over the partition section. Because of this, it is possible to apply the film material with a higher relative velocity between the ink jet nozzle and the substrate, thus attaining higher productivity.

The composite film of the present invention may be so arranged that a thermal imaging process using a laser beam is adopted so as to form the first film on the substrate. With this arrangement, it is possible to form the first film without using a mask for use in exposure. Moreover, a development step after exposure may be omitted in this method. Thereby, it is possible to simplify the step of forming the first film.

A color filter of the present invention is made of any one of the composite films described above. In the color filter, the first film is a light-shielding film and the second film is a transparent color film.

In production of the color filter arranged as above, the color mixing is prevented without deteriorating a high productivity, because the film material is prevented from following over the partition section. Further, in production of the color filter arranged as above, it is possible to prevent the film material from highly uneven in film thickness, thereby attaining lower unevenness in color density by preventing the film material thus applied from having high film thickness unevenness. Thus, it is possible to manufacture the color filter having good property, with high productivity.

Moreover, it is possible to constitute a display apparatus having good display quality and a low cost, by arranging the display apparatus to include the color filter.

In a display apparatus provided with the color filter and an active matrix substrate, faced to the color filter, having switching elements aligned in matrix, it is preferable that the gap width regulating regions superimposing the switching elements respectively.

As described above, a method of the present invention of manufacturing a composite film including a first film and a second film, the first film having a plurality of partition sections extended, in one direction, along each other with a gap region therebetween, and the second film being located in the gap region, the method comprising the steps of: (i) forming the first film on a substrate; and (ii) applying a film material in the gap region by an ink-jet method along the direction in which the partition sections are extended, and curing the film material thus applied, so as to form the second film, the first film having a gap width regulating section, by which a width of the gap region is partially narrowed.

Moreover, a composite film of the present invention is provided with: (a) a first film having a plurality of partition sections extended, in one direction, along each other with a gap region therebetween, and (b) a second film formed by applying a film material in the gap region by an ink-jet method and curing the film material, the first film having a gap width regulating section, by which a width of the gap region is partially narrowed.

According to those arrangements, it is possible to apply the film material at a high relative velocity between the ink jet nozzle and the substrate, while preventing the film material from flowing over the partition section or preventing the film material thus applied from having a highly uneven film thickness. As a result, it is possible to manufacture, at a high productivity, the composite film having good property.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a composite film including a first film and a second film, the first film having a plurality of partition sections extending generally along one direction, facing each other with a gap region therebetween, and the second film being located in the gap region, the method comprising the steps of:
   forming the first film on a substrate; and
   applying a second film material in the gap region by an ink-jet method by traversing an ink jet with respect to the substrate generally along the one direction in which the partition sections are extended, and curing the second film material thus applied, so as to form the second film,
   the first film comprising at least one gap width regulating section, by which a width of the gap region is narrowed in the one direction,
   wherein the gap width regulating section has a corner and said corner is rounded.

2. The method as set forth in claim 1 wherein:
   the gap width regulating section comprises a part of a partition section which extends into the gap region.

3. The method as set forth in claim 1, wherein:
   the gap width regulating section comprises a portion of the first film which is separate from any partition section.

4. The method as set forth in claim 1, wherein:
   all corner portions of said partition sections and of said gap width regulating sections are rounded.

5. The method as set forth in claim 1, wherein:
   the first film comprises a plurality of gap width regulating sections spaced along said one direction,
   the gap width regulating sections located in end parts of the gap region causing the width of the gap region to be narrower than the gap width regulating sections located in a middle part of the gap region.

6. The method as set forth in claim 1, wherein:
   the gap width regulating sections positioned in one end part of the gap region cause the width of the gap region to be narrower than the gap width regulating sections positioned in another end part, and
   wherein the step of applying the film material comprises applying said film material in a direction beginning from the other end part toward the one end part.

7. The method as set forth in claim 1, comprising, prior to the step of applying the second film material in the gap region, the steps of:
   forming a photosensitive film on the substrate on which the first film has been formed, the photosensitive film being of a type which may be rendered more wettable with respect to the second film material by radiating specific light onto the photosensitive film; and
   radiating the specific light onto the photosensitive film to cause that part of the photosensitive film which corresponds to the gap region, to be relatively more wettable than the part of the photosensitive film which is on the first film.

8. The method as set forth in claim 7, wherein:

the substrate is transparent with respect to the specific light, and the first film shields the specific light, and in the step of radiating the specific light, the specific light is radiated through the substrate onto the photosensitive film, the first film serving as a mask blocking said specific light from portions of said photosensitive film.

9. The method as set forth in claim 1, comprising:

forming the first film on the substrate using, a thermal imaging process using a laser beam.

* * * * *